United States Patent
Meyer et al.

(10) Patent No.: US 11,970,615 B2
(45) Date of Patent: Apr. 30, 2024

(54) SILOXANE-CONTAINING BLOCK COPOLYCARBONATES HAVING A SMALL DOMAIN SIZE

(71) Applicant: COVESTRO INTELLECTUAL PROPERTY GMBH & CO. KG, Leverkusen (DE)

(72) Inventors: Alexander Meyer, Düsseldorf (DE); Ulrich Liesenfelder, Bergisch Gladbach (DE); John Huggins, Bonn (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 108 days.

(21) Appl. No.: 17/600,846

(22) PCT Filed: Mar. 30, 2020

(86) PCT No.: PCT/EP2020/058892
§ 371 (c)(1),
(2) Date: Oct. 1, 2021

(87) PCT Pub. No.: WO2020/201178
PCT Pub. Date: Oct. 8, 2020

(65) Prior Publication Data
US 2022/0195123 A1 Jun. 23, 2022

(30) Foreign Application Priority Data
Apr. 2, 2019 (EP) ..................... 19166712

(51) Int. Cl.
*C08L 83/10* (2006.01)
*C08G 77/00* (2006.01)
*C08G 77/448* (2006.01)

(52) U.S. Cl.
CPC ............ *C08L 83/10* (2013.01); *C08G 77/448* (2013.01); *C08G 77/80* (2013.01)

(58) Field of Classification Search
CPC ............................. C08G 64/186; C08G 77/80
See application file for complete search history.

(56) References Cited

U.S. PATENT DOCUMENTS

| | | |
|---|---|---|
| 2,991,273 A | 7/1961 | Wilhelm et al. |
| 2,999,835 A | 9/1961 | Goldberg |
| 2,999,846 A | 9/1961 | Hermann et al. |
| 3,148,172 A | 9/1964 | Fox |
| 3,189,662 A | 6/1965 | Vaughn, Jr. |
| 3,271,367 A | 9/1966 | Hermann et al. |
| 3,419,634 A | 12/1968 | Vaughn, Jr. |
| 4,982,014 A | 1/1991 | Freitag et al. |
| 5,097,002 A | 3/1992 | Sakashita et al. |
| 5,227,449 A | 7/1993 | Odell et al. |
| 5,340,905 A | 8/1994 | Kuehling et al. |
| 5,414,054 A | 5/1995 | Jonsson et al. |
| 5,504,177 A | 4/1996 | King et al. |
| 5,717,057 A | 2/1998 | Sakashita et al. |
| 5,821,321 A | 10/1998 | Archey et al. |
| 6,284,824 B1 | 9/2001 | Iji et al. |
| 9,598,578 B1* | 3/2017 | Groote ................. C08G 64/186 |
| 10,035,884 B2 | 7/2018 | Meyer et al. |
| 2007/0238846 A1 | 10/2007 | Davis et al. |
| 2013/0267665 A1 | 10/2013 | Huggins et al. |
| 2015/0011688 A1 | 1/2015 | An et al. |
| 2021/0108033 A1* | 4/2021 | Kimura ................ C09D 183/10 |

FOREIGN PATENT DOCUMENTS

| | | |
|---|---|---|
| DE | 0334782 C | 3/1921 |
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3832396 A1 | 2/1990 |
| DE | 19523000 A1 | 1/1996 |
| DE | 10311063 A1 | 9/2004 |
| DE | 102007011069 A1 | 9/2008 |
| DE | 102008019503 A1 | 10/2009 |
| EP | 0122535 A2 | 10/1984 |
| EP | 0222599 A2 | 5/1987 |
| EP | 0329092 A1 | 8/1989 |
| EP | 0460466 A1 | 12/1991 |
| EP | 0500496 A1 | 8/1992 |
| EP | 0517068 A1 | 12/1992 |
| EP | 0528210 A1 | 2/1993 |
| EP | 0638354 A1 | 2/1995 |
| EP | 0715881 A2 | 6/1996 |
| EP | 0715882 A2 | 6/1996 |
| EP | 0798093 A2 | 10/1997 |
| EP | 0839623 A1 | 5/1998 |
| EP | 1308084 A1 | 5/2003 |
| EP | 1436073 A1 | 7/2004 |
| FR | 1561518 A | 3/1969 |
| WO | 96/15102 A2 | 5/1996 |
| WO | 01/05867 A1 | 1/2001 |
| WO | 2001/005866 A1 | 1/2001 |
| WO | 2004/016674 A1 | 2/2004 |
| WO | 2004/063249 A1 | 7/2004 |
| WO | 2015/005229 A1 | 1/2015 |

(Continued)

OTHER PUBLICATIONS

International Search Report and Written Opinion received for PCT Patent Application No. PCT/EP2020/058892, dated Apr. 24, 2020, 13 pages (6 pages of English Translation and 7 pages of Original Document).

*Primary Examiner* — Marc S Zimmer
(74) *Attorney, Agent, or Firm* — The Webb Law Firm

(57) ABSTRACT

The present invention relates to a method for preparing a polysiloxane-polycarbonate block co-condensate, wherein a siloxane component containing both aliphatic and aromatic groups is used as a mediator. The invention also relates to a polycarbonate composition and also to the use of the special siloxane component for reducing the particle size distribution of the siloxane domains in a polysiloxane-polycarbonate block co-condensate.

15 Claims, 1 Drawing Sheet

(56) References Cited

FOREIGN PATENT DOCUMENTS

WO       2017/042272 A1   3/2017
WO       2018114901 A1   6/2018

\* cited by examiner

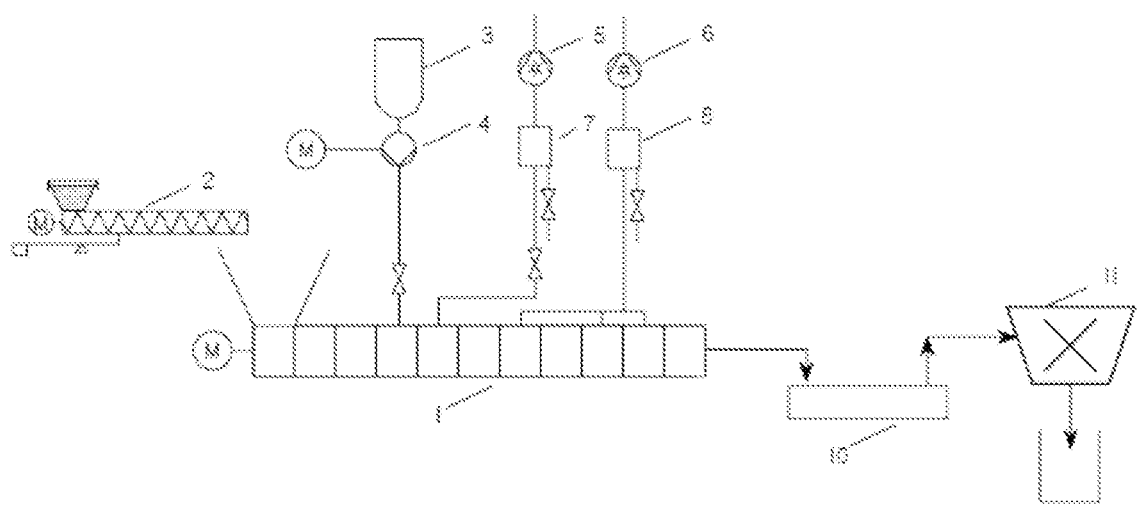

SILOXANE-CONTAINING BLOCK COPOLYCARBONATES HAVING A SMALL DOMAIN SIZE

CROSS-REFERENCE TO RELATED APPLICATIONS

This application is a national stage application (under 35 U.S.C. § 371) of PCT/EP2020/058892, filed Mar. 30, 2020, which claims benefit of European Application No. 19166712.0, filed Apr. 2, 2019, both of which are incorporated herein by reference in their entirety.

The present invention relates to polysiloxane-polycarbonate block co-condensates (hereinbelow also referred to as SiCoPC) having a low siloxane domain size. The block co-condensates are preferably produced in the melt transesterification process from special polycarbonates and hydroxyaryl-terminated polysiloxanes. The present invention especially relates to polysiloxane-polycarbonate block co-condensates comprising special compatibilizers. The invention further relates to production of the recited block co-condensates by means of a reactive extrusion. The polysiloxane block co-condensates according to the invention exhibit a fine polysiloxane domain distribution and feature good mechanical properties and good melt stability.

It is known that polysiloxane-polycarbonate block co-condensates exhibit good properties in terms of low-temperature impact strength/low-temperature notched impact strength, chemicals resistance and exterior weathering resistance as well as aging characteristics and fire resistance. They are in some cases superior to conventional polycarbonates (for example bisphenol A-based homopolycarbonate) in terms of these properties.

These co-condensates are normally industrially produced from the monomers by the interfacial process with phosgene. The production of these polysiloxane-polycarbonate block co-condensates by the melt transesterification process using diphenyl carbonate is also known. These processes have the disadvantage that the industrial plants used therefor are used for producing standard polycarbonate and therefore have a large plant size. The production of special block co-condensates is often not economically viable in these plants due to the smaller volume of these products. Furthermore, the input materials required for producing the co-condensates, for example the polydimethylsiloxanes, can impair the plant since they can lead to contamination of the plant or the solvent circuits. Production moreover requires input materials such as phosgene or entails high energy demands such as in the melt transesterification process.

Production of polysiloxane-polycarbonate block co-condensates by the interfacial process is known from the literature and is described for example in U.S. Pat. Nos. 3,189,662, 3,419,634, DE-A 3 34 782 and EP 0 122 535.

Production of polysiloxane-polycarbonate block co-condensates by the melt transesterification process from bisphenol, diaryl carbonate, silanol-end-terminated polysiloxanes and catalyst is described in U.S. Pat. No. 5,227,449. The siloxane compounds employed are polydiphenyl/polydimethylsiloxane telomers with silanol end groups. However, it is known that in contrast to diphenylsiloxane having silanol end groups such dimethylsiloxanes having silanol end groups have an increasing propensity for autocondensation in the acidic or basic medium with decreasing chain length, and therefore incorporation into the resulting copolymer is thus impeded. Cyclic siloxanes thus formed remain in the polymer and are extraordinarily disruptive in applications in the electrical/electronics sector.

U.S. Pat. No. 5,504,177 describes the production of a polysiloxane-polycarbonate block co-condensate by melt transesterification from a carbonate-terminated silicone with bisphenol and diaryl carbonate. The great incompatibility of the siloxanes with bisphenol and diaryl carbonate has the result that uniform incorporation of the siloxanes into the polycarbonate matrix via the melt transesterification process is achievable only with great difficulty, if at all.

Disadvantages of all these processes include the use of organic solvents in at least one step of the synthesis of the polysiloxane-polycarbonate block co-condensates or the use of phosgene as an input material or the inadequate quality of the co-condensate. In particular, the synthesis of the co-condensates from the monomers is very costly and complex both in the interfacial process and especially in the melt transesterification process. Thus, melt processes for example must employ a light vacuum and low temperatures to prevent evaporation and thus removal of the monomers. Only in later reaction stages in which oligomers having higher molar masses have formed can lower pressures and higher temperatures be employed. This means that the reaction must be run as a multistage process, with the result that the reaction times are correspondingly long.

Reactive extrusion processes for producing siloxane-based block copolycarbonates have also been described in order to avoid the above described disadvantages. This has been publicized for example in U.S. Pat. Nos. 5,414,054 and 5,821,321. This comprises reacting a conventional polycarbonate with a special polydimethylsiloxane in a reactive extrusion process. However, the disadvantage of this process is the use of special silicone components which are costly. This process moreover employs highly active transesterification catalysts which enable production of the co-condensates in an extruder over short residence times. However, these transesterification catalysts remain in the product and can be inactivated only insufficiently, if at all. Injection molded articles made of the thus-produced co-condensates therefore exhibit inadequate aging characteristics, especially inadequate heat aging characteristics. The resulting block copolycarbonate is thus not suitable for high-quality applications. Compared to a block copolycarbonate from the interfacial process this product does not exhibit the appropriate properties, such as aging characteristics and mechanical properties.

A further problem in the production of siloxane-containing block co-condensates by the melt transesterification process starting from polycarbonates and polydimethylsiloxanes is the high concentration of the reactants in the reaction mixture. In comparison, the concentration of the reactants in the interfacial process is low since this process is performed in solution and additionally proceeds from the monomers, i.e. from a bisphenol. The bisphenol is thus subjected to condensation with the siloxane block in dilute solution. This has the result that the domain size in the melt transesterification process—provided that oligo- or polycarbonates are used as the starting material—is markedly greater than compared to a process which is performed in dilute solution and proceeds from the monomers. Corresponding materials produced in the melt transesterification process thus often suffer from surface defects. These surface defects are a direct consequence of the high domain size.

In the interfacial process the domain size is typically below 100 nm. This makes it possible to obtain translucent or even transparent materials since the low domain size hardly results in any light scattering.

The production of siloxane-containing block co-condensates having a low haze is known in principle. WO 2004016674 comprises producing a precondensate from an oligocarbonate and siloxane in the interfacial process which is then in a second step subjected to further condensation with a bisphenol in the interfacial process.

It is known in principle that additives can be used to reduce the domain size of the siloxane domains in the block co-condensate. However, the addition of interface-active substances, as described for example in DE19523000, cannot be employed in the process according to the invention since said substances are not compatible with the high temperatures and relatively long residence times associated with the melt transesterification process. Other compatibilizers too usually cannot be employed on account of the high temperatures since they are decomposed or result in a product having insufficient melt stability.

US20070238846 describes haze-free siloxane block co-condensates proceeding from siloxane blocks having a particularly low molecular weight. These block co-condensates too are produced in the interfacial process.

The melt transesterification process has the disadvantage that it is fundamentally impossible to operate the process in high dilution and the reactants are always highly concentrated. According to experience this results in the formation of siloxane domains between 0.1 and 10 μm in size.

A high domain size has an adverse effect on processing characteristics. Large domains can result in demixing which may manifest in an inhomogenous surface structure and in some cases leads to flow lines and striping. Since large domains are shear sensitive such materials are also difficult to process by injection molding and only very narrow processing windows are therefore possible. It is thus sometimes necessary to use very low injection speeds which is often undesirable since it reduces cycle times.

Melt transesterification processes and in particular so-called reactive extrusion processes in principle entail a risk of catalysts remaining in the end product, which in subsequent processing—for example in injection molding—may result in molecular weight degradation. This may manifest in surface defects and generally in poor processing characteristics.

U.S. Pat. No. 6,284,824 B1 and WO 2017/042272 A1 disclose special siloxanes employed in polycarbonate compositions to improve the flame retardance thereof. Since these documents are silent about polysiloxane-polycarbonate block co-condensates and the production thereof they do not provide any teaching about the behavior of the disclosed siloxanes in the production of polysiloxane-polycarbonate block co-condensates.

Starting from the recited prior art it is therefore an object of the present invention to overcome at least one disadvantage of the prior art. It is a particular object of the present invention to develop a polysiloxane-polycarbonate block co-condensate having a small siloxane domain size which simultaneously exhibits good mechanical properties. The block co-condensate shall preferably be produced in the melt transesterification process.

The domain sizes shall achieve a D90 of less than 120 nm, preferably less than 110 nm and especially preferably less than 100 nm. The proportion of particles having a diameter smaller than 100 nm shall preferably be more than 70%, especially preferably more than 80% and very particularly preferably more than 90% based on the total number of siloxane domains.

These objects are achieved by the polycarbonate composition according to the invention, the process according to the invention and the use according to the invention.

It has surprisingly been found that addition of a siloxane-based additive containing both aromatic and aliphatic groups makes it possible to obtain block co-condensates having a low siloxane domain size. SiCoPCs having a high melt stability were simultaneously obtained. Without wishing to be bound to a particular theory the simultaneous presence of aromatic groups and aliphatic groups in the siloxane-based additive appears to have a compatibilizing effect between the different phases of the polycarbonate and the siloxane block. This results especially in a melt transesterification process in an improved siloxane domain distribution with reduced size. This effect is better than with a siloxane-based additive comprising only aromatic groups.

The improved siloxane domain size had the result that improved processing characteristics of the SiCoPC were obtained. The tendency for demixing was reduced and the processing window for injection molding of the polycarbonate compositions according to the invention was widened.

The present invention thus provides inter alia a process for producing polysiloxane-polycarbonate block co-condensates, wherein A) at least one polycarbonate is reacted in the melt with B) at least one hydroxyaryl-terminated (poly)siloxane using C) at least one siloxane of general chemical formula (I), (Ia) or any desired mixtures thereof,

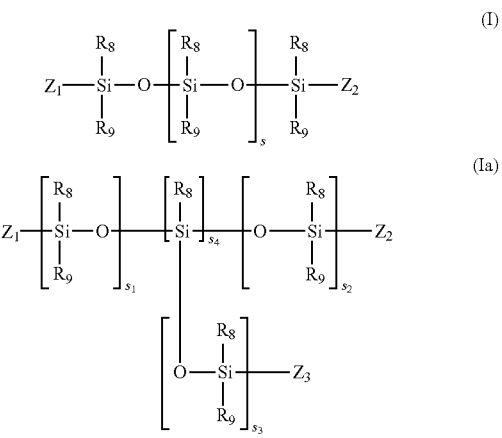

in which $Z_1$, $Z_2$ and $Z_3$ each independently of one another represent methyl, ethyl, propyl, butyl, isopropyl, isobutyl, vinyl, propenyl, butenyl, C5 to C18 alkyl, methacryloxypropyl; monodicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, $R_8$ and $R_9$ each independently of one another represent an aliphatic or an aromatic group with the proviso that in the formula (I) or (Ia) at least one $R_8$ represents an aliphatic group and at least one $R_9$ represents an aromatic group and $s$, $s_1$, $s_2$, $s_3$ and $s_4$ is a natural number between 1 and 250, characterized in that the process comprises a step of adding the component C) to the component A), to the component B) and/or to a mixture of component A) and B).

The present invention likewise provides a polycarbonate composition containing
(i) at least one polysiloxane-polycarbonate block co-condensate,
(ii) at least one siloxane of general chemical formula (I), (Ia) or any desired mixtures thereof,

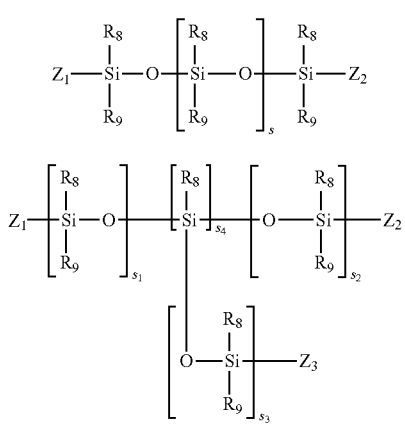

in which $Z_1$, $Z_2$ and $Z_3$ each independently of one another represent methyl, ethyl, propyl, butyl, isopropyl, isobutyl, vinyl, propenyl, butenyl, C5 to C18 alkyl, methacryloxypropyl; 2,3-epoxypropyloxy, monodicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN,
$R_8$ and $R_9$ each independently of one another represent an aliphatic or an aromatic group with the proviso that in the formula (I) or (Ia) at least one $R_8$ represents an aliphatic group and at least one $R_9$ represents an aromatic group and
s, $s_1$, $s_2$, $s_3$ and $s_4$ is a natural number between 1 and 250,
(iii) optionally at least one further polymer distinct from component (i) and
(iv) optionally at least one further additive.

Such a composition preferably results from using the process according to the invention. The process according to the invention affords a polysiloxane-polycarbonate block co-condensate which thus preferably constitutes the component (i) of the composition according to the invention. When the process according to the invention is performed in the presence of the component C) said component remains in the product at least in traces so that the direct product of the process may be the polycarbonate composition according to the invention.

The process according to the invention is firstly described in more detail hereinbelow. However, it will be appreciated that these descriptions are also elucidating for the polycarbonate composition according to the invention for the reason recited above.

The process according to the invention preferably comprises, or particularly preferably is, a polycondensation process. It is moreover preferable when the process according to the invention is performed in a melt transesterification process. Polycarbonate A) is preferably reacted with the hydroxyaryl-terminated (poly)siloxane B) and the component C) in the melt in an extruder or high-viscosity reactor. Such processes are also known as reactive extrusion processes.

The melt transesterification process and the reactive extrusion process are well known (for example U.S. Pat. Nos. 5,227,449, 5,504,177 and the literature cited above).

The extruder or melt reactor may be a single-screw reactor, a twin-screw reactor or a multi-screw reactor, for example, a planetary roller extruder or a ring extruder. A high-volume kneader reactor may also be concerned.

The process may be carried out in a single apparatus—for example a twin-screw extruder or else in two stages, i.e. a reactor combination. The reactor combination preferably consists of a pre-reactor—such as a twin-screw extruder—and a high-viscosity reactor.

The process is preferably performed at temperatures of 280° C. to 370° C., preferably of 290° C. to 360° C., more preferably of 300° C. to 350° C., and pressures of 0.001 mbar to 5 mbar, preferably 0.005 mbar to 4 mbar, especially preferably 0.02 to 3 mbar and very particularly preferably 0.03 to 1 mbar, preferably in the presence of a catalyst. The reactor employed is preferably a single-screw or twin-screw extruder, especially preferably a co-rotating twin-screw extruder. The twin-screw extruder has the feature that it comprises two or more vacuum zones. The processing temperature (melt temperature) when using a twin-screw extruder is preferably 280° C. to 400° C., preferably 290° C. to 380° C., and the pressure in the first stage is 500 to 0.01 mbar, preferably 200 to 0.1 mbar, and in the subsequent vacuum stages is 0.001 mbar to 50 mbar.

The reactive extrusion process may be performed in a two-stage process, wherein the reactor combination preferably consists of a twin-screw or single-screw extruder and a high-viscosity reactor and the resulting low molecular weight cleavage products are removed by evaporation in the vacuum. The twin- or single-screw extruder is used for melting the polycarbonate and admixing the further input materials such as the silicone component and optionally catalysts optionally in the form of masterbatches. The mixing and pre-reaction of the components is also carried out therein. The preliminary product is then supplied to the high-viscosity reactor in which with simultaneous supply of thermal and mechanical energy under vacuum it reacts to completion to afford the polycondensation product. The volatile low molecular weight cleavage products and other low molecular weight constituents may be withdrawn either in the pre-reactor (single- or twin-screw extruder), downstream of the pre-reactor and/or in the high-viscosity reactor. In a preferred embodiment low molecular weight constituents are removed under vacuum already in the pre-reactor. This is particularly preferably effected in two vacuum stages, wherein the first stage is preferably operated at an absolute pressure of 10 to 800 mbar and particularly preferably at an absolute pressure of 10 to 100 mbar and the second vacuum stage is preferably operated at 0.1 to 100 mbar absolute pressure and particularly preferably at 0.2 to 5 mbar. The reaction in the high-viscosity reactor is likewise performed under vacuum. The vacuum is 0.001 mbar to 50 mbar, preferably 0.005 mbar to 40 mbar, especially preferably 0.02 to 30 mbar and very particularly preferably 0.03 to 5 mbar absolute.

Apparatuses employed as the high-viscosity reactor according to the invention include those suitable for the processing of high-viscosity melts which provide good commixing coupled with sufficient residence time and subject the melt to the vacuum required according to the invention. The patent literature describes numerous apparatuses that in principle meet these requirements and may be employed in accordance with the invention. It is possible for example to employ reactors according to EP 460 466, EP 528 210, EP 638 354, EP 715 881, EP 715 882, EP 798 093 or reactors according to EP 329 092, according to EP 517 068, EP 1 436 073 or WO 20021114 or reactors according to EP 222 599.

It is preferable to employ a kinematically self-cleaning reactor according to EP 460 466 which consists of two or more parallel co-rotating or counter-rotating, preferably counter-rotating, shafts on which axially offset, not necessarily circular disks having wipers distributed over their circumference are disposed, and a surrounding housing. This reactor/mixer is characterized in that all surfaces of the wipers are kinematically cleaned, in that especially for shafts rotating at identical speed in any radial section through the mixer all outward-facing surfaces of the wipers a shaft, provided they are cleaned by the housing, are concentric to the rotational center but otherwise have approximately the axis spacing as the radius of curvature and are convex and are cleaned by an adjacent shaft or its wipers, in that especially for shafts rotating at identical speed all inward-facing surfaces of the wipers of a shaft in any radial section through the mixer have approximately the axis spacing as the radius of curvature and are concave and are cleaned by wipers of another adjacent shaft. For better commixing the melt may be passed through further mixing elements. For example a static mixer may be employed between the pre-reactor and the high-viscosity reactor.

A single-shaft screw, a twin-shaft screw or a gear pump is used for discharging the co-condensates that have reacted to completion from the high-viscosity reactor. Additives and/or additions may optionally also be supplied and incorporated. The incorporation of the additions may be carried out in the discharging apparatus or in a downstream static mixer. The melt is shaped by means of one or more nozzles and comminuted with a pelletizing device according to the prior art.

The process according to the invention makes it possible to obtain the corresponding block co-condensates in short reaction times. In this context a short reaction time is to be understood as meaning the reaction time required to produce the molten starting polycarbonate up to the target viscosity with incorporation of the siloxane component. The reaction time is preferably less than a ½ hour, especially preferably less than 15 minutes and very particularly preferably less than 7.5 minutes. In a particularly preferred embodiment the reaction time is less than 30 minutes, especially preferably less than 20 minutes.

The polycarbonate to be employed according to the invention and the (poly)siloxane to be employed according to the invention may be reacted using catalysts. A reaction mode without a catalyst is possible in principle but higher temperatures and longer residence times may have to be accepted as a result.

Catalysts suitable for the process according to the invention are for example ammonium catalysts such as for example tetramethylammonium hydroxide, tetramethylammonium acetate, tetramethylammonium fluoride, tetramethylammonium tetraphenylboranate, dimethyldiphenylammonium hydroxide, tetraethylammonium hydroxide, cetyltrimethylammonium tetraphenylboranate and cetyltrimethylammonium phenoxide. Especially suitable are phosphonium catalysts of formula (K):

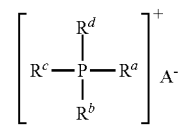

wherein Ra, Rb, Rc and Rd may be identical or different C1-C10-alkyls, C6-C14-aryls, C7-C15-arylalkyls or C5-C6-cycloalkyls, preferably methyl or C6-C14-aryls, particularly preferably methyl or phenyl, and X— may be an anion such as hydroxide, sulfate, hydrogensulfate, hydrogencarbonate, carbonate or a halide, preferably chloride or an alkylate or arylate of formula —OR, wherein R may be C6-C14-aryl, C7-C15-arylalkyl or C5-C6-cycloalkyl, preferably phenyl.

Particularly preferred catalysts are tetraphenylphosphonium chloride, tetraphenylphosphonium hydroxide and tetraphenylphosphonium phenoxide, where tetraphenylphosphonium phenoxide is very particularly preferred. It is particularly preferable to employ the alkali metal salts or alkaline earth metal salts of these ammonium and/or phosphonium catalysts.

The catalyst is preferably employed in amounts of 0.0001% to 1.0% by weight, preferably of 0.001% to 0.5% by weight, especially preferably of 0.005% to 0.3% by weight and very particularly preferably of 0.01% to 0.15% by weight based on the total composition.

The catalyst may be employed alone or as a catalyst mixture and may be added in pure form or as a solution, for example in water or in phenol (for example as a solid solution with phenol).

It is likewise preferable when the polycarbonate and the (poly)siloxane are reacted in the presence of an organic or inorganic salt of a weak acid having a $pK_A$ in the range from 3 to 7 (25°). This salt may also be referred to as co-catalyst. Suitable weak acids comprise carboxylic acids, preferably C2-C22-carboxylic acids such as for example acetic acid, propanoic acid, oleic acid, stearic acid, lauric acid, benzoic acid, 4-methoxybenzoic acid, 3-methylbenzoic acid, 4-tert-butylbenzoic acid, p-tolueneacetic acid, 4-hydroxybenzoic acid and salicylic acid, partial esters of polycarboxylic acids, for example monoesters of succinic acid, partial esters of phosphoric acids, for example mono- or diorganic phosphoric esters, branched aliphatic carboxylic acids, such as for example 2,2-dimethylpropionic acid, 2,2-dimethylbutanoic acid, 2,2-dimethylpentanoic acid and 2-ethylhexanoic acid.

Suitable organic or inorganic salts are selected from or derived from hydrogencarbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium oleate, potassium oleate, lithium oleate, sodium benzoate, potassium benzoate, lithium benzoate, disodium, dipotassium and dilithium salts of bisphenol A. The salts may further comprise calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate and the corresponding oleates. The salts may be used alone or in any desired mixtures.

The salt is particularly preferably selected from the group consisting of alkali metal salts and phosphonium salts of carboxylic acids. In a further preferred embodiment the organic or inorganic salt is derived from a carboxylic acid.

The organic or inorganic salts are preferably employed in amounts of 0.5 to 1000 ppm, particularly preferably of 1 to 100 ppm and very particularly preferably of 1 to 10 ppm based on the total weight of the siloxane and the organic or inorganic salt. The organic or inorganic salts are preferably employed in an amount of 0.0005 to 5 mmol/kg, particularly preferably 0.001 to 1 mmol/kg and very particularly preferably of 0.001 to 0.5 mmol/kg based on the total weight of the siloxane, the polycarbonate and the organic or inorganic salt.

In a preferred embodiment the organic or inorganic salt is a sodium salt, preferably a sodium salt of a carboxylic acid. Said salt is preferably employed in such an amount that the sodium content in the resulting polysiloxane-polycarbonate block co-condensate is in the range from 0.1 ppm to 1000 ppm, preferably 0.2 to 100 ppm, particularly preferably 0.3 to 10 ppm and especially preferably 0.4 to 5 ppm based on the total weight of the polysiloxane-polycarbonate block co-condensate that is to be formed. The sodium content of the co-condensate may be determined for example by atom absorption spectroscopy.

The organic or inorganic salt may be employed alone or in any desired mixtures. It may be added as a solid or in solution. In a preferred embodiment the organic or inorganic salt is added in the form of a mixture containing the siloxane and the organic or inorganic salt.

Catalysts suitable for the process according to the invention are those recited hereinabove which are introduced into the reaction either by means of a masterbatch with a suitable polycarbonate, in particular the polycarbonate according to the invention described hereinabove, or may be introduced separately therefrom or in addition.

The catalysts may be employed alone or in admixture and be added in pure form or as a solution, for example in water or in phenol.

It is preferable when the catalyst is added in pure form, as a mixture or in a masterbatch in the pre-reactor, preferably in a twin-screw extruder.

Component A)

In the context of the present invention the term polycarbonates comprises both homopolycarbonates and copolycarbonates and also mixtures of polycarbonates. The polycarbonates may be linear or branched in known fashion. Production of the polycarbonates may be carried out in known fashion by the melt transesterification process or the interfacial process.

To produce the polysiloxane-polycarbonate block co-condensate according to the invention it is preferable to use polycarbonates having molecular weights of 8000 to 28 000 g/mol, particularly preferably of 10 000 to 27 000 g/mol and especially preferably of 12 000 to 26 500 g/mol. These polycarbonates preferably have a content of phenolic OH groups of 250 ppm to 2500 ppm, preferably 500 to 2000 ppm and especially preferably of 1000 to 1800 ppm. The phenolic OH groups are preferably determined by IR spectroscopy.

The method used for determining the molar masses reported in the context of the invention for the polycarbonate, the siloxane component or the polysiloxane-polycarbonate block co-condensate is method no. 2301-0257502-09D of Currenta GmbH & Co. OHG which is available from Currenta upon request.

It is further preferable when polycarbonates having relative solution viscosities of 1.10 to 1.285 are employed for producing the polysiloxane-polycarbonate block co-condensate according to the invention. The solution viscosity ($\eta_{rel}$; also referred to as the relative solution viscosity) is preferably determined using an Ubbelohde viscometer in dichloromethane at a concentration of 5 g/l at 25° C.

Preferred diphenols for producing the polycarbonates are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclohexane and 1,1-bis(4-hydroxyphenyl)-3,3,5-trimethylcyclohexane.

Particularly preferred diphenols are 2,2-bis(4-hydroxyphenyl)propane (BPA), hydroquinone, 1,1-bis(4-hydroxyphenyl)-3,3,5-trimethylcyclohexane and 2,2-bis(3-methyl-4-hydroxyphenyl)propane.

It is especially the case that polycarbonates based on bisphenol A are employed. It is very particularly preferable when these polycarbonates contain phenol as the end group. Especially polycarbonates produced by the melt transesterification process are suitable for producing the block co-condensates according to the invention.

When reactive extrusion is used for producing the block co-condensates a preferred embodiment comprises employing polycarbonates containing particular rearrangement structures. The polycarbonates for use in this embodiment contain at least one, preferably more than one, of the following structures (4) to (7):

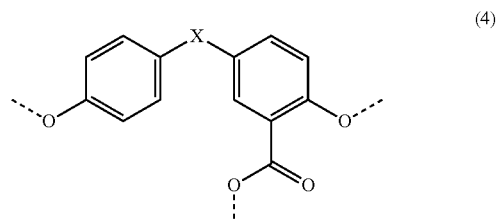

(4)

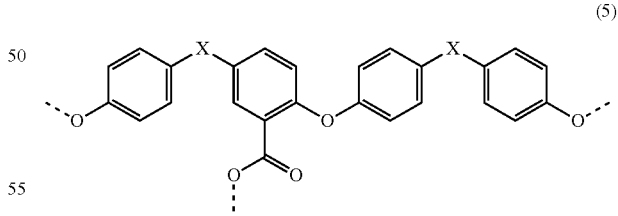

(5)

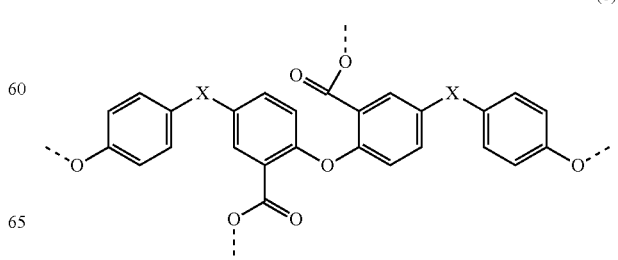

(6)

(7)

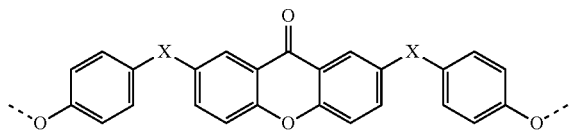

in which the phenyl rings may independently of one another be mono- or disubstituted with C1-C8 alkyl, halogen, preferably C1 to C4 alkyl, particularly preferably with methyl and X represents a single bond, C1 to C6 alkylene, C2 to C5 alkylidene or C5 to C6 cycloalkylidene, preferably a single bond or C1 to C4 alkylene and especially preferably isopropylidene, wherein the amount of structural units (4) to (7) in total (determined after hydrolysis) is generally in the range from 50 to 1000 ppm, preferably in the range from 80 to 850 ppm.

Preference is further given to polycarbonates that bear phenol as end groups (phenyl-terminated polycarbonate). tert-Butylphenol and cumylphenol are further possible end groups.

In order to determine the amount of the rearrangement structures the respective polycarbonate is subjected to a total hydrolysis to form the corresponding degradation products of formulae (4a) to (7a), the amount of which is determined by HPLC (this may be accomplished for example as follows: The polycarbonate sample is hydrolysed under reflux by means of sodium methoxide. The corresponding solution is acidified and concentrated to dryness. The drying residue is dissolved in acetonitrile and the phenolic compounds of the formula (1a) to (4a) are determined by means of HPLC with UV detection):

(4a)

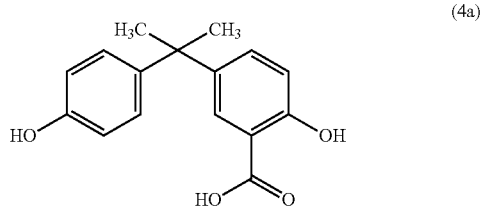

-continued (5a)

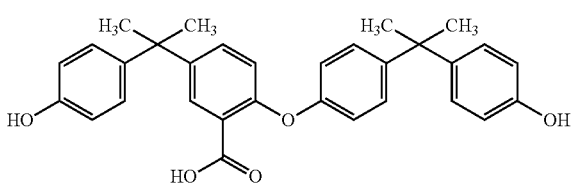

(6a)

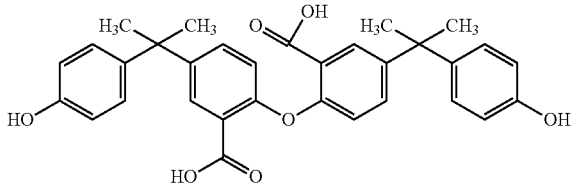

(7a)

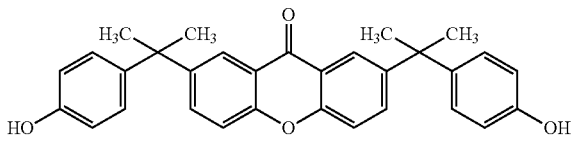

The amount of the thus-liberated compound of formula (4a) is preferably 20 to 800 ppm, particularly preferably 25 to 700 ppm and especially preferably 30 to 500 ppm.

The amount of the thus-liberated compound of formula (5a) is preferably 0 (i.e. below the detection limit of 10 ppm) to 100 ppm, particularly preferably 0 to 80 ppm and especially preferably 0 to 50 ppm.

The amount of the thus-liberated compound of formula (6a) is preferably 0 (i.e. below the detection limit of 10 ppm) to 800 ppm, more preferably 10 to 700 ppm, particularly preferably 20 to 600 ppm and very particularly preferably 30 to 350 ppm.

The amount of the thus-liberated compound of formula (7a) is preferably 0 (i.e. below the detection limit of 10 ppm) to 300 ppm, preferably 5 to 250 ppm and especially preferably 10 to 200 ppm.

The production of such polycarbonates containing the abovementioned rearrangement structures is described for example in DE 102008019503.

Component B)

Component B is preferably a hydroxyaryl-terminated (poly)siloxane of formula (1)

(1)

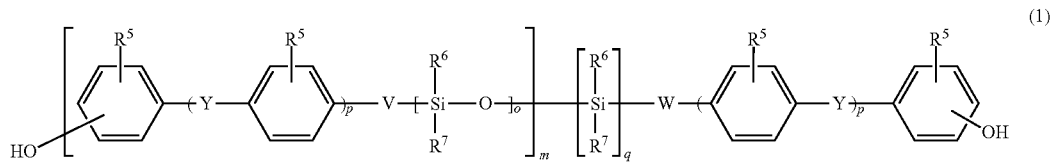

In general formula (1) $R^5$ represents hydrogen or C1- to C4-alkyl, C1- to C4-alkoxy, preferably hydrogen or methyl, methyloxy, particularly preferably hydrogen.

$R^6$ and $R^7$ independently of one another represent aryl, preferably phenyl, C1 to C4 alkyl, preferably methyl, especially methyl.

Y represents a single bond, —CO—, —O—, $C_1$- to $C_5$-alkylene, $C_2$- to $C_5$-alkylidene or a $C_5$- to $C_6$-cycloalkylidene radical which may be mono- or polysubstituted by $C_1$- to $C_4$-alkyl, preferably a single bond, —O—, isopropylidene or a $C_5$- to $C_6$-cycloalkylidene radical which may be mono- or polysubstituted by $C_1$- to $C_4$-alkyl, especially isopropylidene.

V represents oxygen, C2-C6 alkylene or C3- to C6-alkylidene, preferably oxygen or C3-alkylene.

When q=0, W represents a single bond.

When q=1, W represents oxygen, C2 to C6-alkylene or C3- to C6-alkylidene, preferably oxygen or C3-alkylene.

p or q each independently represent 0 or 1.

o represents an average number of repeating units from 10 to 400, preferably 10 to 100, particularly preferably 15 to 50.

m represents an average number of repeating units from 1 to 10, preferably 1 to 6, particularly preferably 1.5 to 5.

Especial preference is given to (poly)siloxanes of formulae (2) and (3)

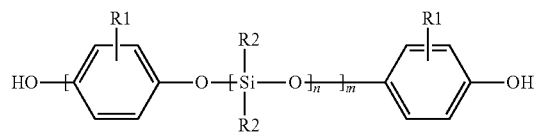

(2)

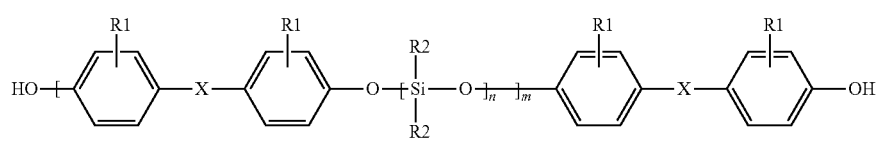

(3)

wherein R1 represents hydrogen, C1-C4-alkyl, preferably hydrogen or methyl and especially preferably hydrogen, R2 independently at each occurrence represents aryl or alkyl, preferably methyl, X represents a single bond, —$SO_2$—, —CO—, —O—, —S—, C1- to C6-alkylene, C2- to C5-alkylidene or C6- to C12-arylene which may optionally be fused to further aromatic rings containing heteroatoms, X preferably represents a single bond, C1 to C5-alkylene, C2 to C5-alkylidene, C5 to C12-cycloalkylidene, —O—, —SO— —CO—, —S—, —$SO_2$—, particularly preferably a single bond, isopropylidene, C5 to C12 cycloalkylidene or oxygen and very particularly preferably isopropylidene, n represents an average number from 10 to 400, preferably 10 to 100, especially preferably 15 to 50 and m represents an average number from 1 to 10, preferably from 1 to 6 and especially preferably from 1.5 to 5.

The siloxane block may similarly preferably be derived from the following structure

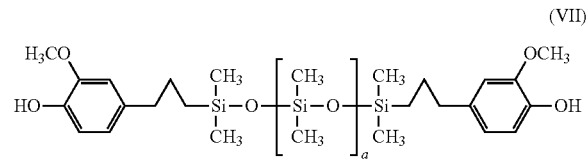

(VII)

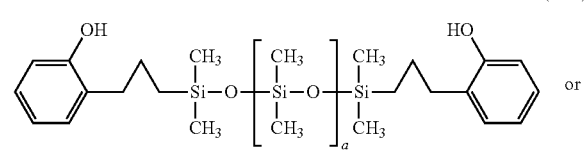

(VIII)

or

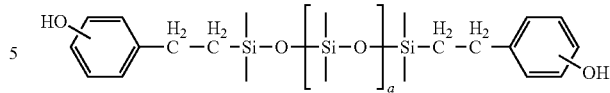

(IX)

wherein a in formulae (VII), (VIII) and (IX) represents an average number from 10 to 400, preferably 10 to 100 and particularly preferably 15 to 50.

The molecular weight of the siloxane component is preferably 1500 to 20 000 g/mol and especially preferably 3500-15 000 g/mol. The molecular weight is preferably determined as described hereinabove under component A).

Production of the siloxanes of formulae (1) to (3) is described for example in DE 33 34 782 A1, DE 19710081 and WO 2015/05229.

The siloxane component of formula (1), (2) or (3) or else (VII), (VIII) or (IX) are employed in amounts of 0.50% to 50% by weight, preferably of 10% to 40% by weight, especially preferably of 2% to 20% by weight and very particularly preferably of 2.5% to 10% by weight in each case based on the components A) and B).

The preparation of the siloxane blocks is known in principle and they can be prepared by processes as described, for example, in US20130267665.

Component C)

Employed as component C) according to the invention is at least one siloxane of general chemical formula (I), (Ia) or any desired mixtures thereof,

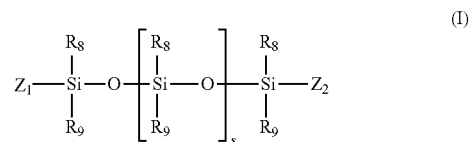

(I)

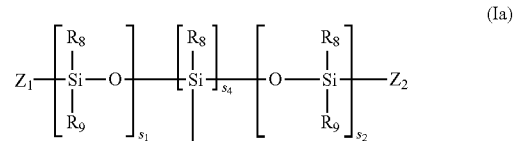

(Ia)

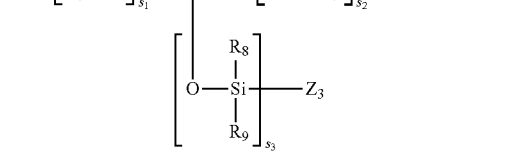

in which $Z_1$, $Z_2$ and $Z_3$ each independently of one another represent methyl, ethyl, propyl, butyl, isopropyl, isobutyl, vinyl, propenyl, butenyl, C5 to C18 alkyl, methacryloxypropyl; monodicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, $R_8$ and $R_9$ each independently of one another represent an aliphatic or an aromatic group with the proviso that in the formula (I) or (Ia) at least one $R_8$ represents an aliphatic group and at least one $R_9$ represents an aromatic group and s, $s_1$, $s_2$, $s_3$ and $s_4$ each independently of one another represent a natural number between 1 and 250, preferably 1 to 100, particularly preferably 1 to 75.

This component C) according to the invention corresponds to the component (i) according to the invention in the polycarbonate composition according to the invention. The following description therefore relates to both components according to the invention independently of one another.

It has surprisingly been found that in the process for producing a polysiloxane-polycarbonate block co-condensate the presence of at least one aliphatic group and at least one aromatic group in the component C) results in a marked reduction in the siloxane domain distribution and markedly more particles having a particle diameter of less than 100 nm are obtained. According to the invention this is brought about by the better compatibilization of components A) and B) by component C).

The component C) or (ii) according to the invention is linear and/or has a comb-like and/or plug-like structure.

It is preferable when $R_8$ in general chemical formula (I) or (Ia) independently at each occurrence represents methyl, ethyl, propyl, butyl, isopropyl, vinyl, isobutyl, C5 to C18-alkyl or optionally alkyl- or alkoxy-substituted phenylethyl, phenylisopropyl, 3-phenylpropyl or phenyl and $R_9$ in general chemical formula (I) or (Ia) independently at each occurrence represents methyl, ethyl, propyl, butyl, isopropyl, isobutyl, vinyl, C5 to C18-alkyl or optionally alkyl- or alkoxy-substituted phenylethyl, phenylisopropyl, 3-phenylpropyl or phenyl, with the proviso that at least one $R_8$ represents methyl, ethyl, propyl, butyl, isopropyl, vinyl, isobutyl or C5 to C18-alkyl and at least one $R_9$ represents optionally alkyl- or alkoxy-substituted phenylethyl, phenylisopropyl, 3-phenylpropyl or phenyl. It is preferable according to the invention when the optionally present substitution with alkyl or alkoxy relates to each of the specified phenyls (i.e. phenylethyl, phenylisopropyl, 3-phenylpropyl or phenyl) independently. It is particularly preferable according to the invention when the optionally present substitution of the phenylethyl, phenylisopropyl, 3-phenylpropyl or phenyl is C1-C9 alkyl, a methoxy group or an ethoxy group. It is very particularly preferable when in all embodiments of the present invention the optionally alkyl- or alkoxy-substituted phenylethyl, phenylisopropyl, 3-phenylpropyl or phenyl is —CH$_2$CH$_2$CH$_2$(C$_6$R$_5$), —CH$_2$CH$_2$(C$_6$R$_5$), —CH$_2$CH(CH$_3$)—(C$_6$R$_5$) or —C$_6$R$_5$, wherein each R may independently of one another be H, alkyl or alkoxy, preferably C1 to C9 alkyl, a methoxy group or an ethoxy group. Very particularly preferably concerned is —CH$_2$CH$_2$CH$_2$(C$_6$H$_5$), —CH$_2$CH$_2$(C$_6$H$_5$), —CH$_2$CH(CH$_3$)—(C$_6$H$_5$) or —C$_6$H$_5$.

$Z_1$, $Z_2$ and $Z_3$ have the definitions recited hereinabove. It is preferable when $Z_1$, $Z_2$ and $Z_3$ each independently of one another represent methyl, vinyl, phenyl or hydroxy.

It is particularly preferable when $R_8$ in general chemical formula (I) or (Ia) independently at each occurrence represents methyl, ethyl, trimethylphenyl, —CH$_2$—CH$_2$-phenyl, —CH$_2$—CH$_2$—CH$_2$-phenyl, —CH$_2$—CH(CH$_3$)-phenyl, —CH$_2$—CH$_2$—CH$_2$-(2-methoxy)phenyl or phenyl and $R_9$ in general chemical formula (I) independently at each occurrence represents methyl, ethyl, trimethylphenyl, —CH$_2$—CH$_2$-phenyl, —CH$_2$—CH$_2$—CH$_2$-phenyl, —CH$_2$—CH(CH$_3$)phenyl, —CH$_2$—CH$_2$—CH$_2$-(2-methoxy)phenyl or phenyl with the proviso that at least one $R_8$ represents methyl or ethyl and at least one $R_9$ represents trimethylphenyl or phenyl. $Z_1$, $Z_2$ and $Z_3$ have the definitions recited hereinabove. It is preferable when $Z_1$, $Z_2$ and $Z_3$ each independently of one another represent methyl, vinyl, phenyl or hydroxy.

The groups $R_8$ and $R_9$ together with the Si—O group are groups which form a "D" unit known to those skilled in the art. Particularly preferred D units are selected from the following structures:

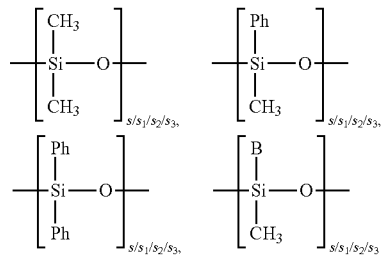

wherein Ph independently at each occurrence represents —CH$_2$—CH$_2$-phenyl, —CH$_2$—CH$_2$—CH$_2$-phenyl, —CH$_2$—CH(CH$_3$)-phenyl or phenyl and B independently at each occurrence represents C2 to C18 alkyl and the number of repeating units s, $s_1$, $s_2$, $s_3$ and $s_4$ are defined according to the invention according to whether the D unit belongs to structural formula (I) or (Ia). Those skilled in the art are able to read these D units into structural formula (I) or (Ia).

It is likewise known to those skilled in the art that the last siloxane unit together with the end groups $Z_1$, $Z_2$ or $Z_3$ form an "M" unit. M units preferred according to the invention are selected from the group consisting of

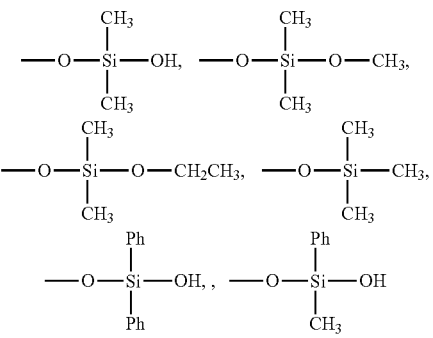

wherein Ph independently at each occurrence represents —CH$_2$—CH$_2$-phenyl, —CH$_2$—CH$_2$—CH$_2$-phenyl, —CH$_2$—CH(CH$_3$)-phenyl or phenyl. Those skilled in the art are able to read these M units into structural formula (I) or (Ia).

Those skilled in the art are also aware that together with two oxygen atoms the structure of formula (Ia) which is in the parenthesis having the index $s_4$ forms a "T" unit. According to the invention the radical $R_9$ in this T unit is selected from the group consisting of a methyl group and a Ph group, wherein Ph independently at each occurrence represents —$CH_2$—$CH_2$-phenyl, —$CH_2$—$CH_2$—$CH_2$-phenyl, —$CH_2$—$CH(CH_3)$-phenyl or phenyl. Those skilled in the art are able to read these T units into the structural formula (Ia).

In all of these preferences it is preferable when s, $s_1$, $s_2$, $s_3$ and $s_4$ each independently of one another in general formula (I) represent a natural number between 3 and 50, preferably between 4 and 25, especially preferably between 5 and 15. Pure substances or oligomer mixtures may be concerned. In the case of an oligomer mixture s, $s_1$, $s_2$, $s_3$ and $s_4$ are thus average values of the distribution and thus represent an average number. In this case s, $s_1$, $s_2$, $s_3$ and $s_4$ may also be a decimal number.

It is especially preferable when component C) is a mixture of at least one siloxane of formula (I) and at least one siloxane of formula (Ia). It is preferable when the at least one siloxane of formula (Ia) is present in the mixture in an amount of up to 10% by weight, preferably 1% to 5% by weight, very particularly preferably 2% to 4% by weight, based on the total weight of all siloxanes of formula (I) and (Ia) in the mixture.

It is moreover preferable when the at least one siloxane of component (ii)/of component C) is represented by general chemical formula (II), general chemical formula (IIa), general chemical formula (III) and/or general chemical formula (IV)

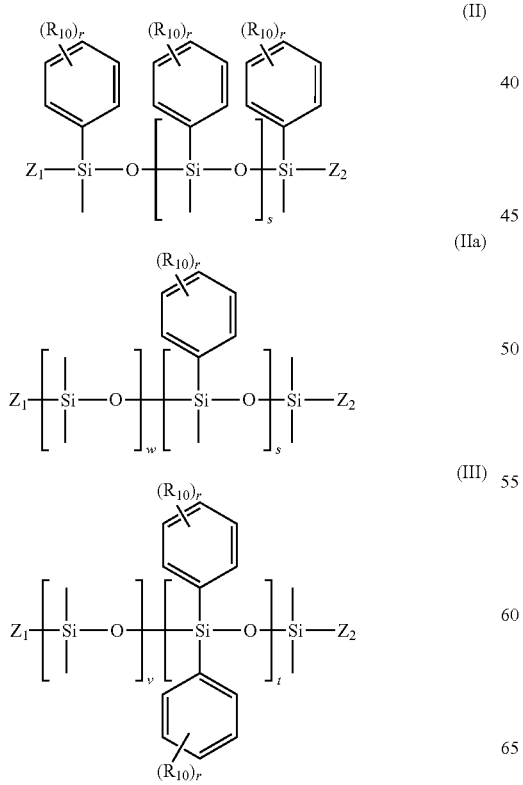

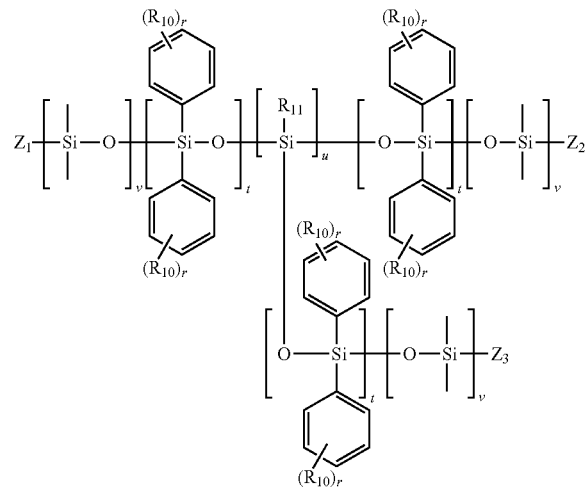

in which $Z_1$, $Z_2$ and $Z_3$ each independently of one another represent methyl, ethyl, propyl, butyl, isopropyl, isobutyl, vinyl, propenyl, butenyl, C5 to C18 alkyl, methacryloxypropyl; monodicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, preferably methyl, methoxy, ethoxy, hydrogen or hydroxy, $R_{10}$ independently at each occurrence represents hydrogen, methyl, ethyl, propyl, butyl, isopropyl, isobutyl, isooctyl, isononyl or isodecyl, $R_{11}$ independently at each occurrence represents methyl, ethyl, propyl, butyl, isopropyl, isobutyl, vinyl, propenyl, butenyl, C5 to C18 alkyl, methacryloxypropyl; monodicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, r is a natural number between 0 and 3, s and t are each independently a natural number between 1 and 250, preferably 1 to 100, particularly preferably 1 to 75, very particularly preferably 1 to 50, similarly preferably between 4 and 25, especially preferably between 5 and 15, w and v are each independently a natural number between 1 and 250, preferably between 1 and 100, especially preferably between 5 and 75, and groups having the indices s, w, v, t and u may have a random distribution in the siloxane of component (ii)/of component C), preferably have a random distribution in the siloxane of component (ii)/of component C).

It is especially preferable when the component (ii)/the component C) is a mixture of at least one siloxane selected from the group consisting of general chemical formula (II), (IIa) and (III) and up to 5% by weight of a siloxane of formula (Ia), preferably of formula (IV).

It is preferred in particular when in general chemical formulas (II), (IIa), (III) and (IV)

$Z_1$, $Z_2$ and $Z_3$ each independently of one another represent methyl, vinyl, methoxy, ethoxy, hydrogen or hydroxy, preferably methyl, hydroxy or a mixture of methoxy and ethoxy, $R_{10}$ represents hydrogen or methyl, $R_{11}$ independently at each occurrence represents methyl, phenyl, vinyl, methoxy, ethoxy, hydrogen or hydroxy, preferably methyl or phenyl, r is a natural number between 0 and 3, particularly preferably 0, s is a natural number between 1 and 100, preferably 5 and 75, particularly preferably between 5 and 15 t is a natural number between 1 and 75, w is a natural number between 5 and 75, v is a natural number between 1 and 75 and u is a natural number between 1 and 10. It is preferable according to the invention when the expression "a natural number between" includes the number range and the explicitly disclosed threshold values of the range.

It is very particularly preferable when in general chemical formulae (II), (IIa), (III) and (IV)

$Z_1$, $Z_2$ and $Z_3$ are each independently of one another hydroxy, $R_{10}$ is hydrogen, $R_{11}$ independently at each occurrence represents methyl or phenyl, r is 0, s is a natural number between 1 and 100, preferably 5 and 75, particularly preferably between 5 and 15 t is a natural number between 1 and 75, w is a natural number between 5 and 75, v is a natural number between 1 and 75 and u is a natural number between 1 and 10. It is very particularly preferable when the component (ii)/the component C) is a mixture of at least one siloxane selected from the group consisting of general chemical formulae (II), (IIa) and (III) and >=0% by weight to 5-3% by weight, preferably >=0% by weight to 3% by weight, of a siloxane of formula (Ia), preferably of formula (IV).

The process according to the invention is especially characterized in that the reaction melt is admixed with component C) in an amount of preferably 0.010% to 20% by weight, particularly preferably 0.010% to 10% by weight, especially preferably 0.05% to 2.5% by weight, more preferably 0.10% to 2.0% by weight, very particularly preferably 0.20% to 1.0% by weight, based on the total composition (sum of component A to C). The addition may be effected at any desired location in the process at any desired juncture. The component C) is preferably added to the reaction mixture at an early juncture. The component C is preferably dissolved in component B, preferably using stirring apparatuses and heat, and added to the polycarbonate melt as a mixture. The component C) may also be added before addition of the component B) and/or of the component A). For example the component C) may also be melted jointly with the polycarbonate at commencement of the reaction or plasticized together with polycarbonate in a reactive extrusion.

The component C) may be introduced directly or in the form of a masterbatch. The component C) may be mixed with other components, for example a catalyst, for example according to structure (K). A suitable substrate material for the masterbatch is for example polycarbonate, in particular polycarbonate according to the component A).

It is preferable when component C) is employed as a masterbatch containing 0.5 to 99.9 parts by weight of component C)

0.1 to 99.5 parts by weight of polycarbonate as component C3

0 to 1 parts by weight of a phosphonium catalyst as component C4.

It is likewise preferable when 50.0% to 0.5% by weight of polycarbonate according to component A) and with 0.5% to 50.0% by weight of hydroxyaryl-terminated polysiloxane according to component B) based on the amount of A) and B) are employed in the process according to the invention. It is particularly preferable when 98.0% to 80.0% by weight of polycarbonate according to component A) and with 2.0% to 20.0% by weight of hydroxyaryl-terminated polysiloxane according to component B) based on the amount of A) and B) are employed.

In another aspect the invention provides a polycarbonate composition containing (i) at least one polysiloxane-polycarbonate block co-condensate, (ii) at least one siloxane of general chemical formula (I), (Ia) or any desired mixtures thereof,

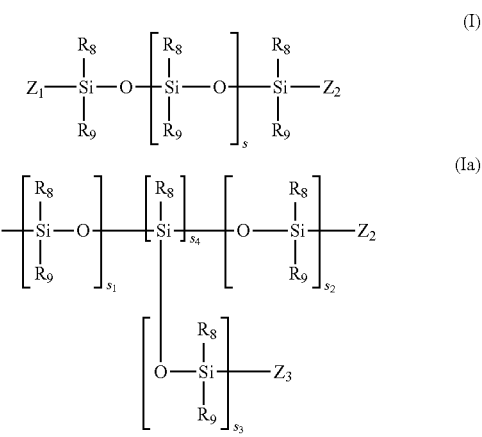

in which $Z_1$, $Z_2$ and $Z_3$ each independently of one another represent methyl, ethyl, propyl, butyl, isopropyl, isobutyl, vinyl, propenyl, butenyl, C5 to C18 alkyl, methacryloxypropyl; monodicarbinol, methoxy, ethoxy, propoxy, butoxy, epoxypropoxypropyl, phenyl, hydroxy, hydrogen, chlorine, fluorine or CN, $R_8$ and $R_9$ each independently of one another represent an aliphatic or an aromatic group with the proviso that in the formula (I) or (Ia) at least one $R_8$ represents an aliphatic group and at least one $R_9$ represents an aromatic group and s, $s_1$, $s_2$, $s_3$ and $s_4$ each independently of one another represent a natural number between 1 and 250, (iii) optionally at least one further polymer distinct from component (i) and (iv) optionally at least one further additive.

Component (i)

The polysiloxane-polycarbonate block co-condensate is preferably composed of the following structural units (X1) and (X2):

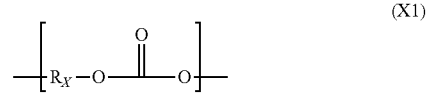

wherein $R_X$ is a divalent substituted or unsubstituted aromatic radical, a divalent linear or cyclic aliphatic radical or the structural unit (X1) is a mixture of building blocks, wherein $R_X$ is a divalent substituted or unsubstituted aromatic radical or $R_X$ is a divalent linear or cyclic aliphatic radical.

and structural unit (X2)

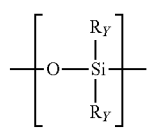

(X2)

wherein $R_Y$ is independently at each occurrence a linear or branched aliphatic radical, preferably C1-C12 alkyl, particularly preferably C1 to C4 alkyl, especially methyl, or a substituted or unsubstituted aromatic radical, preferably phenyl.

The proportion of aromatic $R_X$ radicals in the formula (X1) is 60-100% by weight and the proportion of aliphatic radicals is 0-40% by weight based on the sum of employed diphenols in % by weight. The SiCoPc may preferably be constructed from siloxane blocks derivable from the above-mentioned formula (1).

According to the invention the term derivable in this context is preferably to be understood as meaning that the corresponding building block is esterified into the resulting polymer via the hydroxy groups. In general formula (1) $R^5$ represents hydrogen or C1 to C4 alkyl, preferably hydrogen or methyl, particularly preferably hydrogen. $R^6$ and $R^7$ independently of one another represent C1 to C4 alkyl, preferably methyl.

Y represents a single bond, —CO—, —O—, $C_1$- to $C_5$-alkylene, $C_2$- to $C_5$-alkylidene or a $C_5$- to $C_6$-cycloalkylidene radical which may be mono- or polysubstituted by $C_1$- to $C_4$-alkyl, preferably a single bond, —O—, isopropylidene or a $C_5$- to $C_6$-cycloalkylidene radical which may be mono- or polysubstituted by $C_1$- to $C_4$-alkyl, especially isopropylidene.

V represents oxygen, C2-C6 alkylene or C3- to C6-alkylidene, preferably oxygen or C3-alkylene.

When q=0, W represents a single bond and when q=1, W represents oxygen, C2 to C6-alkylene or C3- to C6-alkylidene, preferably oxygen or C3-alkylene.

p and q each independently of one another represent 0 or 1.

o represents an average number of repeating units from 10 to 400, preferably 10 to 100, particularly preferably 15 to 50.

m represents an average number of repeating units from 1 to 10, preferably 1 to 6, particularly preferably 1.5 to 5.

The siloxane block of the SiCoPC of component (i) especially preferably results from siloxanes of the abovementioned formulae (2) and (3), wherein R1 represents hydrogen, C1-C4-alkyl, preferably hydrogen or methyl and especially preferably hydrogen, R2 independently at each occurrence represents aryl or alkyl, preferably methyl, X represents a single bond, —SO2-, —CO—, —O—, —S—, C1- to C6-alkylene, C2- to C5-alkylidene or C6- to C12-arylene which may optionally be fused to further aromatic rings containing heteroatoms, X preferably represents a single bond, C1 to C5-alkylene, C2 to C5-alkylidene, C5 to C12-cycloalkylidene, —O—, —SO— —CO—, —S—, —SO2-, particularly preferably a single bond, isopropylidene, C5 to C12 cycloalkylidene or oxygen and very particularly preferably isopropylidene, n represents an average number from 10 to 400, preferably 10 to 100, especially preferably 10 to 50 and m represents an average number from 1 to 10, preferably from 1 to 6 and especially preferably from 1.5 to 5.

As recited hereinabove the component (i) is preferably the polysiloxane-polycarbonate block co-condensate produced by the process according to the invention.

It is preferable when the polysiloxane-polycarbonate block co-condensate has a D90 of the siloxane domain size of less than 120 nm, preferably less than 110 nm and especially preferably less than 100 nm. It is likewise preferable when the proportion of particles having a diameter of less than 100 nm is more than 70%, especially preferably more than 80% and very particularly preferably more than 90% based on the total number of siloxane domains. The D90 value and/or the proportion of particles having a diameter of less than 100 nm is determined by AFM. This is preferably done using the parameters described in the examples section and the process described therein. In a further embodiment the siloxane block of the polysiloxane-polycarbonate block co-condensate may have the following structure (IVa)

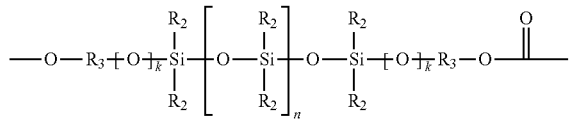

(IVa)

wherein R2 is as defined above, n is an average number from 10 to 400, preferably 10 to 100, particularly preferably 15 to 50, k represents 0 or 1.

R3 independently at each occurrence comprises the following structural elements (V) or (VI):

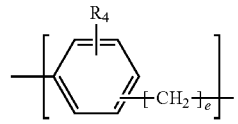

(V)

wherein R4 is independently at each occurrence hydrogen, halogen and/or a C1 to C10, preferably C1 to C4, linear or branched, unsubstituted or mono- to tetrasubstituted alkyl radical or alkoxy radical, wherein the alkyl and alkoxy radicals are preferably unsubstituted, and R4 is especially preferably hydrogen, e is 0 or a natural number from 2 to 12, preferably 2 to 6, wherein, in the case where e is 0, k is 1, or a structural element of formula (VI)

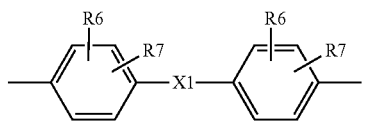

in which
R6 and R7 independently of one another represent H, C1-C18-alkyl, C1-C18-alkoxy, halogen such as Cl or Br or in each case optionally substituted aryl or aralkyl, preferably independently of one another represent H or C1-C12-alkyl, particularly preferably H or C1-C8-alkyl and very particularly preferably independently of one another represent H or methyl, and

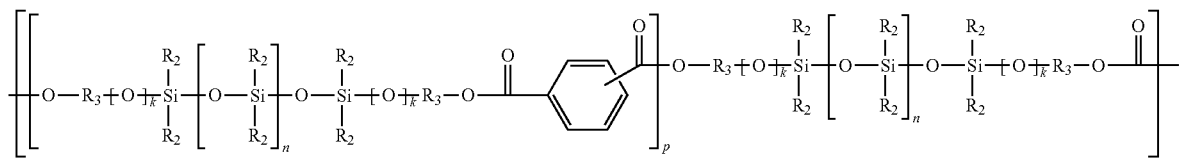

X1 represents —CO—, —O—, —S—, C1- to C6-alkylene, C2- to C5-alkylidene, C6 to C10-cycloalkylidene or C6- to C12-arylene which may optionally be fused to further aromatic rings containing heteroatoms.

It is preferable when X1 represents C1 to C5-alkylene, C2 to C5-alkylidene, C6 to C9-cyclohexylidene —O—, —SO—, —CO—, —S—, —SO2-, particularly preferably isopropylidene, 3,3,5-trimethylcyclohexylidene or oxygen, especially isopropylidene.

By way of example and preferably the siloxane block may derive from the following structure

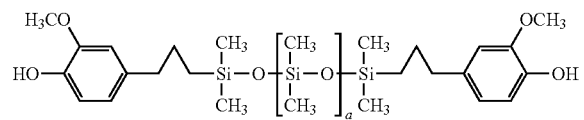

(VII)

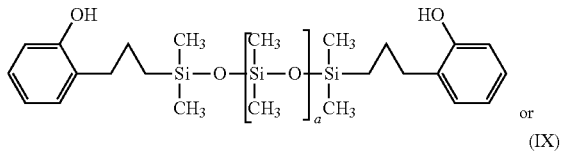

(VIII)

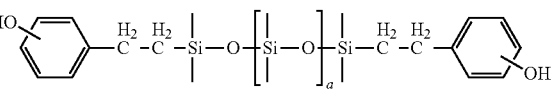

or (IX)

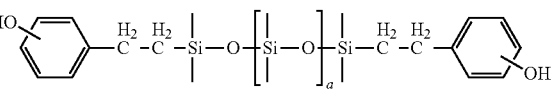

wherein a in formula (VII), (VIII) or (IX) represents an average number from 10 to 400, preferably 10 to 100 and particularly preferably 15 to 50.

In a further embodiment, the abovementioned siloxane blocks may be joined one or more times via terephthalic acid or isophthalic acid to afford the following exemplary structural elements:

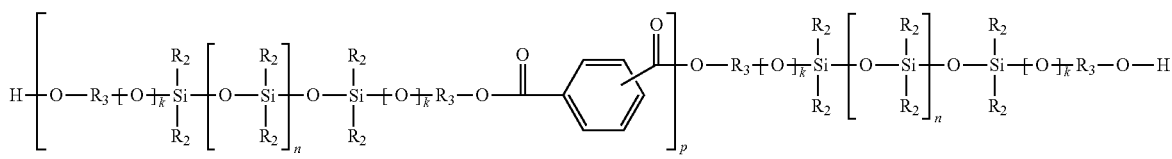

wherein p represents 0 or 1,
R2, R3, n and k are as defined above for structural element (IVa).

Corresponding siloxane blocks for reaction with polycarbonate or for reaction with diphenols derived from formula (III) or (IIIa) with phosgene or diaryl carbonates each have terminal phenolic OH groups. i.e.

(IXa)

wherein R2, R3, n, k and p are as defined for structural element (IXb).

Component (ii)
The component (ii) according to the invention has already been more particularly elucidated above under component C).

Component (iii)
Component (iii) is at least one further polymer distinct from component (i). It is preferably a polycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copolyacrylates and poly- or copolymethacrylate, for example poly- or copolymethylmethacrylates (such as PMMA) and also copolymers with styrene, for example transparent polystyrene-acrylonitrile (PSAN), thermoplastic polyurethanes, polymers based on cyclic olefins (e.g. TOPASR, a commercial product from Ticona).

Component (iii) is particularly preferably a polycarbonate. Polycarbonates in the context of the present invention include not only homopolycarbonates but also copolycarbonates and/or polyester carbonates; the polycarbonates may be linear or branched in a known manner. Also employable according to the invention are mixtures of polycarbonates.

The polycarbonates including the thermoplastic aromatic polyester carbonates preferably have average molecular weights $M_w$ (determined by measuring relative viscosity at 25° C. in $CH_2Cl_2$ and a concentration of 0.5 g per 100 ml of $CH_2Cl_2$) of 20 000 g/mol to 32 000 g/mol, preferably of 23 000 g/mol to 31 000 g/mol, in particular of 24 000 g/mol to 31 000 g/mol.

A portion of up to 80 mol %, preferably of 20 mol % to 50 mol %, of the carbonate groups in the polycarbonates used in accordance with the invention may be replaced by aromatic dicarboxylic ester groups. Polycarbonates of this type that incorporate not only acid radicals derived from carbonic acid but also acid radicals derived from aromatic dicarboxylic acids in the molecular chain are referred to as aromatic polyester carbonates. In the context of the present invention they are subsumed by the umbrella term "thermoplastic aromatic polycarbonates".

The polycarbonates are produced in a known manner from diphenols, carbonic acid derivatives, optionally chain terminators and optionally branching agents, and the polyester carbonates are produced by replacing a portion of the carbonic acid derivatives with aromatic dicarboxylic acids or derivatives of the dicarboxylic acids, to a degree according to the extent to which carbonate structural units in the aromatic polycarbonates are to be replaced by aromatic dicarboxylic ester structural units.

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes, and the ring-alkylated and ring-halogenated compounds thereof.

Diphenols suitable for producing the polycarbonates for use in accordance with the invention are for example hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes and the alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and other suitable diphenols are described by way of example in U.S. Pat. Nos. 2,999,835 A, 3,148,172 A, 2,991,273 A, 3,271,367 A, 4,982,014 A and 2,999,846 A, in German laid-open specifications 1 570 703 A, 2 063 050 A, 2 036 052 A, 2 211 956 A and 3 832 396 A, in the French patent specification 1 561 518 A1, in the monograph "H. Schnell, Chemistry and Physics of Polycarbonates, Interscience Publishers, New York 1964, p. 28ff and p. 102ff", and in "D. G. Legrand, J. T. Bendler, Handbook of Polycarbonate Science and Technology, Marcel Dekker New York 2000, p. 72 ff.".

In the case of the homopolycarbonates only one diphenol is used and in the case of copolycarbonates two or more diphenols are used. The diphenols employed, similarly to all other chemicals and assistants added to the synthesis, may be contaminated with the contaminants from their own synthesis, handling and storage. However, it is desirable to use raw materials of the highest possible purity.

The monofunctional chain terminators required for molecular-weight regulation, for example phenols or alkylphenols, in particular phenol, p-tert-butylphenol, isooctylphenol, cumylphenol, chlorocarbonic esters thereof or acyl chlorides of monocarboxylic acids or mixtures of these chain terminators, are either supplied to the reaction with the bisphenoxide(s) or else are added at any desired juncture in the synthesis provided that phosgene or chlorocarbonic acid end groups are still present in the reaction mixture or, in the case of acyl chlorides and chlorocarbonic esters as chain terminators, as long as sufficient phenolic end groups of the forming polymer are available. However, it is preferable when the chain terminator(s) is/are added after the phosgenation at a location or at a juncture at which phosgene is no longer present but the catalyst has not yet been added or when they are added before the catalyst or together or in parallel with the catalyst.

Any branching agents or branching agent mixtures to be used are added to the synthesis in the same manner, but typically before the chain terminators. Compounds typically used are trisphenols, quaterphenols or acyl chlorides of tri- or tetracarboxylic acids, or else mixtures of the polyphenols or of the acyl chlorides.

Examples of some of the compounds employable as branching agents and having three or more phenolic hydroxyl groups include phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuryl chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of the optionally employable branching agents is 0.05 mol % to 2 mol % in turn based on moles of diphenols employed in each case.

The branching agents may either be initially charged with the diphenols and the chain terminators in the aqueous alkaline phase or added dissolved in an organic solvent before the phosgenation.

All of these measures for producing the polycarbonates are familiar to those skilled in the art.

Aromatic dicarboxylic acids suitable for producing the polyester carbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of the dicarboxylic acids are the dicarbonyl dihalides and the dialkyl dicarboxylates, especially the dicarbonyl dichlorides and the dimethyl dicarboxylates.

Replacement of the carbonate groups by the aromatic dicarboxylic ester groups is substantially stoichiometric, and also quantitative, and the molar ratio of the reactants is therefore also maintained in the final polyester carbonate. The aromatic dicarboxylic ester groups can be incorporated either randomly or blockwise.

Preferred modes of production of the polycarbonates to be used according to the invention, including the polyester carbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

In the former case the employed acid derivatives are preferably phosgene and optionally dicarbonyl dichlorides and in the latter case preferably diphenyl carbonate and optionally dicarboxylic diesters.

Catalysts, solvents, workup, reaction conditions etc. for polycarbonate production or polyester carbonate production are sufficiently well described and known for both cases.

Component (iv)

The polymer composition according to the invention may optionally contain at least one further additive as component (iv). This at least one additive may be selected from additives and/or fillers and reinforcers. These additives and/or fillers and reinforcers may be admixed in amounts of 0.0% by weight to 5.0% by weight, preferably 0.01% by weight to 1.00% by weight, based on the sum of the components (i) to (iv). Possible additives are selected from at least one from the group of flame retardants, UV protectants, gamma stabilizers, antistats, optical brighteners, flow improvers, heat stabilizers, inorganic pigments, mold release agents and processing aids.

The additives are customary polymer additives, for example those described in EP-A 0 839 623, WO-A 96/15102, EP-A 0 500 496 or "Plastics Additives Handbook", Hans Zweifel, 5th Edition 2000, Hanser Verlag, Munich.

These additives may be added to the polymer melt individually or in any desired mixtures or a plurality of distinct mixtures. This may be added to the polycarbonate directly during isolation of the polymer (for example via a side unit such as a side extruder) as a pure substance or in the form of a masterbatch or else after melting of the polycarbonate granulate in a so-called compounding step. The additives or the mixtures thereof can be added to the polymer melt as a solid, i.e. as a powder, or as a melt. Another mode of metered addition is the use of masterbatches or mixtures of masterbatches of the additives or additive mixtures.

In a preferred embodiment the polymer composition contains heat or processing stabilizers. Phosphites and phosphonites are preferentially suitable, as are phosphines. Examples include triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyldibenzo[d,g]-1,3,2-dioxaphosphocine, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl)pentaerythritol diphosphite, triphenylphosphine (TPP), trialkylphenylphosphine, bisdiphenylphosphinoethane or a trinaphthylphosphine. Especially preferably employed are triphenylphosphine (TPP), Irgafos® 168 (tris(2,4-di-tert-butylphenyl) phosphite) and tris(nonylphenyl) phosphite or mixtures thereof.

Also employable are phenolic antioxidants such as alkylated monophenols, alkylated thioalkylphenols, hydroquinones and alkylated hydroquinones. Particularly preferably employed are Irganox® 1010 (pentaerythritol-3-(4-hydroxy-3,5-di-tert-butylphenyl) propionate; CAS: 6683-19-8) and Irganox 1076® (2,6-di-tert-butyl-4-(octadecanoxycarbonylethyl)phenol).

Suitable UV absorbers are described, for example, in EP 1 308 084 A1, in DE 102007011069 A1 and in DE 10311063 A1.

Particularly suitable ultraviolet absorbers are hydroxybenzotriazoles such as 2-(3',5'-bis(1,1-dimethylbenzyl)-2'-hydroxyphenyl)benzotriazole (Tinuvin® 234, Ciba Spezialitatenchemie, Basle), 2-(2'-hydroxy-5'-(tert-octyl)phenyl) benzotriazole (Tinuvin® 329, Ciba Spezialitatenchemie, Basle), 2-(2'-hydroxy-3'-(2-butyl)-5'-(tert-butyl)phenyl)benzotriazole (Tinuvin® 350, Ciba Spezialitatenchemie, Basle), bis-(3-(2H-benztriazolyl)-2-hydroxy-5-tert-octyl)methane, (Tinuvin® 360, Ciba Spezialitatenchemie, Basle), (2-(4,6-diphenyl-1,3,5-triazin-2-yl)-5-(hexyloxy)phenol (Tinuvin® 1577, Ciba Spezialitatenchemie, Basle), and the benzophenones 2,4-dihydroxybenzophenone (Chimasorb® 22, Ciba Spezialitatenchemie, Basle) and 2-hydroxy-4-(octyloxy) benzophenone (Chimassorb® 81, Ciba, Basle), 2-propenoic acid, 2-cyano-3,3-diphenyl-, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitatenchemie, Basle) or tetraethyl 2,2'-(1,4-phenylenedimethylidene) bismalonate (Hostavin® B-Cap, Clariant AG).

It is also possible to employ mixtures of these ultraviolet absorbers.

The polymer compositions according to the invention may optionally contain mold release agents.

Particularly suitable mold release agents for the composition according to the invention are pentaerythritol tetrastearate (PETS) or glycerol monostearate (GMS).

The polycarbonate composition according to the invention preferably comprises
- 10-99.95%, preferably 50-99.5%, especially preferably 80-99.5% by weight, of the component (i), in a particular embodiment 98.0%-99.5% by weight of the component (i)
- 0.05% to 2.5% by weight, preferably 0.1% to 2.0% by weight, especially preferably 0.20% to 1.0% by weight, of the component (ii),
- 0% to 90% by weight, preferably 0% to 50% by weight, especially preferably 0% to 20% by weight, of the component (iii) and
- 0% to 15% by weight of the component (iv).

The % by weight values are based on the sum of the components (i) to (iv). It is particularly preferable when the polycarbonate composition consists of the components (i) to (iv). The % by weight values sum to 100% by weight. According to the invention the term "polycarbonate composition" is preferably to be understood as meaning that the composition comprises at least 85% by weight of polycarbonate, including the polycarbonate present in component (i). Additional polycarbonate, which may be distinct from component (i), may be present in the composition through component (iii).

The block co-condensates obtainable by the process according to the invention and the polycarbonate compositions according to the invention may be processed into any desired shaped bodies in the manner known for thermoplastic polycarbonates.

In this connection the compositions according to the invention may be converted into articles of manufacture, shaped bodies or shaped articles for example by hot pressing, spinning, blow molding, thermoforming, extruding or injection molding. Use in multilayer systems is also of interest. Application of the composition obtainable according to the invention may be employed for example in multicomponent injection molding or as a substrate for a coex layer. However, application may also be to the ready-molded main body, for example by lamination with a film or by coating with a solution.

Sheets or shaped bodies composed of a base layer and an optional outerlayer/optional outerlayers (multilayer systems) may be produced by (co)extrusion, direct skinning, direct coating, insert molding, in-mold coating, or other suitable methods known to those skilled in the art.

The polysiloxane-polycarbonate block co-condensates obtainable by the process according to the invention and the polycarbonate compositions according to the invention are employable anywhere where known aromatic polycarbonates have hitherto been used and where good flowability coupled with improved mold release characteristics, high toughness at low temperatures and better chemicals resistance are additionally required, for example for production of large motor vehicle exterior parts and control boxes for exterior applications, of sheets, twin-wall sheets, of parts for electricals and electronics and of optical storage media. The block co-condensates may thus be employed in the IT sector for computer housings, multimedia housings and mobile phone housings, in the household sector such as in washing machines or dishwashers and in the sports sector, for example as a material for helmets.

A further aspect of the present invention provides for a use of a siloxane of general chemical formula (I), (Ia) or any desired mixtures thereof,

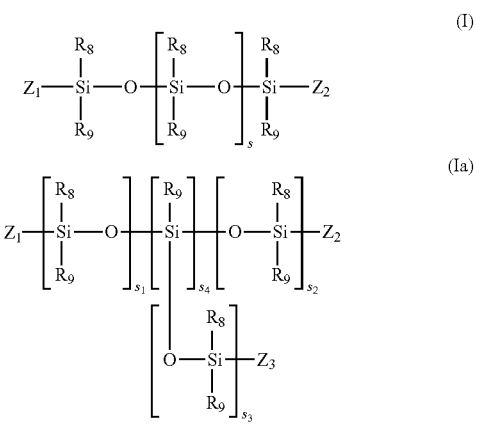

in which $Z_1$, $Z_2$ and $Z_3$ each independently of one another represent methyl, ethyl, propyl, butyl, isopropyl, isobutyl, vinyl, propenyl, butenyl, C5 to C18 alkyl, methacryloxypropyl; monodicarbinol, methoxy, ethoxy, propoxy, butoxy, epoxypropoxypropyl, phenyl, hydroxy, hydrogen, chlorine, fluorine or CN, $R_8$ and $R_9$ each independently of one another represent an aliphatic or an aromatic group with the proviso that in the formula (I) or (Ia) at least one $R_8$ represents an aliphatic group and at least one $R_9$ represents an aromatic group and s, $s_1$, $s_2$, $s_3$ and $s_4$ each independently of one another represent a natural number between 1 and 250, for reducing the particle size distribution of the siloxane domains in a polysiloxane-polycarbonate block co-condensate in a process for producing this polysiloxane-polycarbonate block co-condensate. As recited hereinabove it has surprisingly been found that a compound of general formula (I) or (Ia) is particularly suitable for compatibilizing the different phases in the production of a polysiloxane-polycarbonate block co-condensate and thus bringing about a smaller particle size distribution of the siloxane domains. The process for producing the polysiloxane-polycarbonate block co-condensate preferably comprises at least one reactive extrusion or at least one melt transesterification. It is very particularly preferable when the process comprises a reactive extrusion.

The siloxane of general chemical formula (I) or (Ia) is more particularly elucidated hereinabove under component C) (and also component (ii)). These preferences also apply to the use according to the invention.

WORKING EXAMPLES

There follows a detailed description of the invention with reference to working examples, and the methods of determination described here are employed for all corresponding parameters in the present invention, in the absence of any statement to the contrary.

MVR

Unless stated otherwise, the melt volume flow rate (MVR) is determined according to ISO 1133 (2011) (at 300° C.; 1.2 kg), unless any other conditions are stated.

Solution Viscosity

Determination of solution viscosity: The solution viscosity (ηrel; also referred to as the relative solution viscosity)

was determined using an Ubbelohde viscometer in dichloromethane at a concentration of 5 g/l at 25° C.

Evaluation of the Siloxane Domain Size Using Atomic Force Microscopy (AFM)

The siloxane domain size and distribution were determined using atomic force microscopy. To this end the corresponding sample (in the form of a melt cake for laboratory batches or granulate for extrusion batches) was cut at low temperature (nitrogen cooling) using an ultramicrotome. A Bruker D3100 AFM microscope was used. The AFM image was recorded at room temperature (25° C., 30% relative humidity). The "Soft Intermittent Contact Mode" or "Tapping Mode" were used for the measurement. A "tapping mode cantilever" (Nanoworld pointprobe) having a spring constant of about 2.8 Nm-1 and a resonance frequency of about 75 kHz was used to scan the sample. The tapping force is controlled by the ratio of the target amplitude and the free oscillation amplitude (amplitude of the probe tip with free oscillation in air). The sampling rate was set to 1 Hz. To record the surface morphology phase contrast and topography images were recorded on a 2.5 μm×2.5 μm area. The particles/siloxane domains were evaluated automatically using Olympus SIS image processing software (Olympus Soft Imaging Solutions GmbH, 48149, Münster, Germany) via light-dark contrast (from the phase contrast images). The diameters of the particles were determined from the diameter of the corresponding equal area circle of the longest dimension of the particle.

A plurality of phase contrast images (number of particles greater than 200) are evaluated as described above. The image processing software is used to classify the individual diameters and capture a distribution of the diameters. This is used for assignment to individual D values. The D value indicates the proportion of particles smaller than the specified value. At a D90 value of x 90% of the particles are smaller than x. The proportion of particles smaller than 100 nm is also determined from the distribution.

Effect of Adding Component C)
Starting Materials:
Component A: Polycarbonate

PC 1: The starting material used for the reactive extrusion is linear bisphenol A polycarbonate having end groups based on phenol and a solution viscosity of 1.17 (see above for description). This polycarbonate contains no additives such as UV stabilizers, mold release agents or thermal stabilizers. The polycarbonate was produced by a melt transesterification process as described in DE 102008019503. The polycarbonate has a content of phenolic end groups of 0.16%.

Component B: Siloxane

Bisphenol A-terminated polydimethylsiloxane of formula 3 where n is about 30 and m is in the range from 3 to 4 ($R^1$=H, $R^2$=methyl, X=isopropylidene) having a hydroxy content of 18 mg KOH/g and a viscosity of 400 mPa·s (23° C.); the siloxane is admixed with sodium octanoate and the sodium content is 2.5 ppm.

Component C/(ii):

Linear oligomeric siloxane of formula (I) where $Z_1$ and $Z_2$=OH, $R_8$=methyl, $R_9$=phenyl and s is on average about 4 (oligomeric mixture with chains of s=2 to about 10).

Process:

The scheme of the experimental setup is apparent from FIG. 1.

FIG. 1 shows a scheme for producing the siloxane-containing block co-condensates. Polycarbonate (component A) is metered into the twin-screw extruder (1) via the gravimetric feed (2). The extruder (ZSE 27 MAXX from Leistritz Extrusionstechnik GmbH, Nuremberg) is a co-rotating twin-screw extruder with vacuum zones for removal of the vapors. The extruder consists of 11 barrel sections (a to k)—see FIG. 1. Addition of polycarbonate is carried out in barrel section a via the differential metering balance (2) and the melting of the polycarbonate is carried out in barrels b and c. Addition of the liquid siloxane component (component B) is effected in barrel section d. Barrel sections d and e are also used for incorporating the liquid siloxane component (component B). Barrel sections e, g, i and j are provided with degassing openings to remove the condensation products. Barrel section e is assigned to the first vacuum stage and barrel sections g, i and j are assigned to the second vacuum stage. The vacuum in the first vacuum stage is between 45 and 65 mbar absolute pressure. The vacuum in the second vacuum stage is less than 1 mbar. The siloxane (component B) is initially charged in a tank (3) and introduced into the extruder via a metering pump (4). The vacuum is generated via vacuum pumps (5) and (6). The vapors are conducted away from the extruder and collected in 2 condensers (9). The melt strand is passed into a water bath (10) and comminuted by the granulator (11).

Example 1

For preparation, polycarbonate (component A) was mixed with 0.5% of component C in a solids mixer. 1.9 kg/h of polycarbonate (component A) were metered into the twin-screw extruder (1) via the gravimetric metered addition means (2). The speed of the extruder was set to 120 rpm. 0.09 kg/h of component B were introduced into the barrel (d) of the extruder via the pump (4). A vacuum of 55 mbar was applied to the barrel (e) and a vacuum of 0.5 mbar was applied to each of the barrels (g), (i) and (j). The barrels (g) to (k) were brought to a temperature of 350° C.

The resulting polycondensate was light in color and had an MVR of 2.1. An AFM image measuring 10×10 μm contained 880 identified objects that were assignable to a soft phase and thus to the siloxane phase. The size distribution of the objects had a D90 diameter of 115 nm. The largest identified object corresponded to an equivalent circle diameter of 156 nm.

Comparative Example 2

1.9 kg/h of polycarbonate (component A) were metered into the twin-screw extruder (1) via the gravimetric metered addition means (2). The speed of the extruder was set to 120 rpm. 0.09 kg/h of component B were introduced into the barrel (d) of the extruder via the pump (4). A vacuum of 63 mbar was applied to the barrel (e) and a vacuum of 0.5 mbar was applied to each of the barrels (g), (i) and (j). The barrels (g) to (k) were brought to a temperature of 325° C.

The resulting polycondensate was light in color and had an MVR of 4.4. An AFM image measuring 10×10 μm contained 624 identified objects that were assignable to a soft phase and thus to the siloxane phase. The size distribution of the objects had a D90 diameter of 185 nm. The largest identified object corresponded to an equivalent circle diameter of 516 nm.

The following examples were carried out in the manner of example 1/comparative example 2 with variation of the reported parameters:

TABLE 1

| | Component C) [% by weight] | Extruder speed [rpm] | Through-put [kg/h] | Barrel temperature [° C.] | MVR |
|---|---|---|---|---|---|
| Comparative example 3 | — | 120 | 2.0 | 320 | 6.8 |
| Example 4 | 0.5 | 180 | 2.0 | 310 | 8.5 |
| Comparative example 5 | — | 120 | 2.0 | 325 | 4.4 |
| Example 6 | 0.5 | 120 | 2.0 | 350 | 2.1 |
| Comparative example 7 | — | 120 | 1.42 | 320 | 9.5 |
| Example 8 | 1.0 | 120 | 1.05 | 320 | 5.6 |
| Example 9 | 0.5 | 120 | 1.42 | 320 | 8.1 |

As is apparent from this table comparative example 3 and example 4 are essentially comparable with one another. Polymers having a comparable MVR are obtained despite the use of a slightly different extruder speed and barrel temperature. The examples thus differ in terms of the addition of component C) in example 4 and the absence thereof in comparative example 3.

Similar conclusions can be drawn for the comparability of comparative example 5 and example 6 and of comparative example 7 and examples 8 and 9. The comparisons are suitable for evaluating the effect of adding component C) (and also the amount thereof).

TABLE 2

Domain distribution results

| | Particle size distribution; D90 of average particle diameter [nm] | Content of particles <100 nm [%] | Volume fraction of particles <200 nm [%] |
|---|---|---|---|
| Comparative example 3 | 124.9 | 75.3 | 84.9 |
| Example 4 | 105.9 | 87.6 | 88.3 |
| Comparative example 5 | 184.7 | 54.2 | 49.9 |
| Example 6 | 115.0 | 80.0 | 100.0 |
| Comparative example 7 | 101.2 | 88.7 | 25.0 |
| Example 8 | 91.0 | 94.5 | 100.0 |
| Example 9 | 98.8 | 90.3 | 61.0 |

In the case of throughputs of 2.0 kg/h and materials having an MVR in the range from about 7 to 9 (comparative example 3 and example 4) inventive example 4 shows the positive effect of the low molecular weight siloxane according to the invention. Compared to the comparative example 3 inventive example 4 has a markedly lower D 90 value and thus provides a polymer morphology having a lower siloxane domain size. Increasing the reaction temperature makes it possible to achieve lower viscosities (comparative example 5 and example 6). Inventive example 6, which contains the low molecular weight inventive siloxane addition of component C), shows a markedly lower D90 value than comparative example 5.

The positive effect of adding the special siloxane component is likewise apparent at relatively low throughputs (1.4 kg or less compared to 2.0 kg/h). While comparative example 7 exhibits a similar D90 value to inventive example 9 the proportion of particles having a volume <200 nm is markedly greater than in inventive example 9. Particles having a large volume are particularly critical in terms of processing defects, for example in injection molding. Increasing the proportion of the inventive siloxane component (example 8) achieves further advantages as is apparent from the lower D90 value and from a better volume distribution (particles having a volume >200 nm are no longer present).

Effect of Chemical Structure of Component C)

Starting Materials:

Component A: Polycarbonate

PC A: The starting material used for the reactive extrusion is linear bisphenol A polycarbonate having end groups based on phenol from Covestro Deutschland AG which has a melt volume index of 59-62 cm$^3$/10 min measured at 300° C. and a load of 1.2 kg (according to ISO 1033). This polycarbonate contains no additives such as UV stabilizers, mold release agents or thermal stabilizers. The polycarbonate was produced by a melt transesterification process as described in DE 102008019503. The polycarbonate has a content of phenolic end groups of about 600 ppm.

PC B: The starting material used for the reactive extrusion is linear bisphenol A polycarbonate having end groups based on phenol and a solution viscosity of about 1.17. This polycarbonate contains no additives such as UV stabilizers, mold release agents or thermal stabilizers. The polycarbonate was produced by a melt transesterification process as described in DE 102008019503. The polycarbonate has a content of phenolic end groups of about 1600 ppm.

Component B:

Siloxane 1

Bisphenol A-terminated polydimethylsiloxane of formula 3 where n is about 15 and m is in the range from 3 to 4 ($R^1$=H, $R^2$=methyl, X=isopropylidene) having a hydroxy content of 27.8 mg KOH/g and a viscosity of 165 mPa·s (23° C.); the sodium content is about 4 ppm.

Siloxane 2:

Hydroquinone-terminated polydimethylsiloxane of formula 2 where n is about 20 and m is in the range from 3 to 4 ($R^1$=H, $R^2$=methyl) having a hydroxy content of 22.2 mg KOH/g and a viscosity of 177 mPa·s (23° C.); the sodium content is about 3 ppm.

Siloxane 3:

Bisphenol A-terminated polydimethylsiloxane of formula 3 where n is about 30 and m is in the range from 3 to 4 ($R^1$=H, $R^2$=methyl, X=isopropylidene) having a hydroxy content of 17.9 mg KOH/g and a viscosity of 402 mPa·s (23° C.); the sodium content is about 3 ppm.

Component C/(ii):

Linear oligomeric siloxane of formula (I) where $Z_1$ and $Z_2$=OH, $R_8$=methyl, $R_9$=phenyl and s is on average about 4 (oligomeric mixture with chains of s=2 to about 10).

Comparative Component:

Octaphenylcyclotetrasiloxane (CAS: 546-56-5), 95% from ABCR GmbH & Co.KG (Karlsruhe Germany).

Catalyst Masterbatch (without Siloxane-Based Additional Component):

The catalyst used is tetraphenylphosphonium phenoxide from Rhein Chemie Rheinau GmbH (Mannheim, Germany) in the form of a masterbatch. Tetraphenylphosphonium phenoxide was employed in the form of a solid solution with phenol and contains about 70% tetraphenylphosphonium phenoxide. The amounts which follow are based on the substance obtained from Rhein Chemie (as solid solution with phenol).

The masterbatch was produced as a 0.25% mixture. To this end 4982 g of Polycarbonate PC A were mixed with 18 g of tetraphenylphosphonium phenoxide in a drum hoop mixer for 30 minutes. Metered addition of the masterbatch was carried out in a ratio of 1:10 and the catalyst was therefore present in the total amount of polycarbonate in a proportion of 0.025% by weight.

Comparative Example 10

Weighed into a 250 ml glass flask fitted with a stirrer and short path separator were 42.5 g of polycarbonate granulate (PC A; 85% by weight), 2.5 g of siloxane 1 (5% by weight) as well as 5 g (10% by weight) of catalyst masterbatch and 0.1 g (0.2% by weight) of octaphenylcyclotetrasiloxane. The apparatus was evacuated and inertized with nitrogen (3× in each case). The mixture was melted under vacuum over 10 minutes using a metal bath preheated to 350° C. The pressure in the apparatus was about 1.5 mbar. The reaction mixture was kept under this vacuum with stirring for 30 minutes. The mixture was subsequently inertized with nitrogen and the polymer melt withdrawn. An opaque white polymer was obtained. The product has a solution viscosity eta rel=1.345.

Comparative Example 11

Weighed into a 250 ml glass flask fitted with a stirrer and short path separator were 42.5 g of polycarbonate granulate (PC A; 85% by weight), 2.5 g of siloxane 2 (5% by weight) as well as 5 g (10% by weight) of catalyst masterbatch (in a departure from the above this further contained 1.66% by weight of octaphenylcyclotetrasiloxane). The apparatus was evacuated and inertized with nitrogen (3× in each case). The mixture was melted under vacuum over 10 minutes using a metal bath preheated to 350° C. The pressure in the apparatus was about 1.5 mbar. The reaction mixture was kept under this vacuum with stirring for 30 minutes. The mixture was subsequently inertized with nitrogen and the polymer melt withdrawn. An opaque white polymer was obtained. The product has a solution viscosity eta rel=1.46.

Example 12

47.4 g of polycarbonate granulate (PC B; 94.8% by weight) were weighed into a 250 ml glass flask fitted with a stirrer and short path separator. The apparatus was evacuated and inertized with nitrogen (3× in each case). The mixture was melted under atmospheric pressure over 10 minutes using a metal bath preheated to 350° C. A siloxane mixture composed of 2.5 g of siloxane 3 (5% by weight) and 0.13 g (0.2% by weight) of component C (dissolved in siloxane 3) was added at 10 mbar. The pressure in the apparatus was then reduced to about 1.5 mbar. The reaction mixture was kept under this vacuum with stirring for about 5 minutes. The mixture was subsequently inertized with nitrogen and the polymer melt withdrawn. An opaque white polymer was obtained. The product has a solution viscosity eta rel=1.38.

TABLE 3

Domain distribution results

| | Particle size distribution; D90 of average particle diameter [nm] | Content of particles <100 nm [%] |
|---|---|---|
| Example 12 | 110.4 | 85.3 |

Comparative examples 10 and 11 showed a clearly coarse particle distribution in the AFM; an exact evaluation was therefore eschewed and only an estimate was made.

TABLE 4

Domain distribution results

| | Large particle diameter (40 μm image) [nm] | Small particle diameter (2.5 μm image) [nm] |
|---|---|---|
| Comparative example 10 | 1700 (elongate) | 20-270 (round) |
| Comparative example 11 | 1000 (elongate) | 26-240 (round) |

Comparison of example 12 with comparative examples 10 and 11 shows that the addition of a compound comprising both aliphatic and aromatic groups results in a reduced siloxane domain distribution in the production of a polysiloxane-polycarbonate block co-condensate compared to a compound comprising only aromatic groups.

The invention claimed is:

1. A polycarbonate composition containing (i) at least one polysiloxane-polycarbonate block co-condensate, (ii) at least one siloxane, (iii) optionally at least one further polymer distinct from component (i) and (iv) optionally at least one further additive, wherein the at least one siloxane of component (ii) is represented by general chemical formula (II), general chemical formula (IIa), general chemical formula (III) and/or general chemical formula (IV)

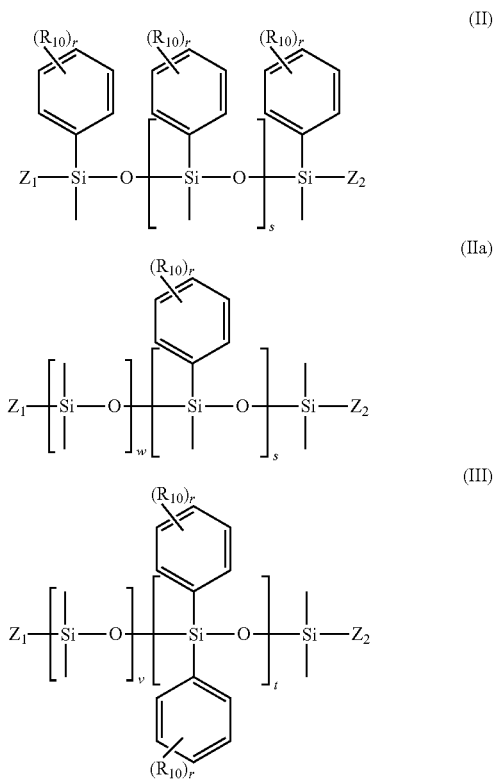

-continued

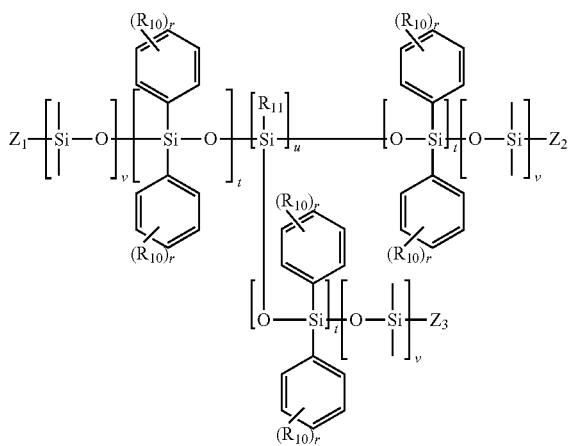
(IV)

in which $Z_1$, $Z_2$ and $Z_3$ each independently of one another represent methyl, ethyl, propyl, butyl, isopropyl, isobutyl, vinyl, propenyl, butenyl, C5 to C18 alkyl, methacryloxypropyl; mono or dicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, $R_{10}$ independently at each occurrence represents hydrogen, methyl, ethyl, propyl, butyl, isopropyl, isobutyl, isooctyl, isononyl or isodecyl, $R_{11}$ independently at each occurrence represents methyl, ethyl, propyl, butyl, isopropyl, isobutyl, vinyl, propenyl, butenyl, C5 to C18 alkyl, methacryloxypropyl; mono or dicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, r is a natural number between 0 and 3, s and t are each independently of one another a natural number between 1 and 250, and w and v are each independently of one another a natural number between 1 and 250, and groups having the indices s, w, v, t and u can have a random distribution in the siloxane of component (ii).

2. The polycarbonate composition as claimed in claim 1, wherein in general chemical formulae (II), (IIa), (III) and (IV)

$Z_1$, $Z_2$ and $Z_3$ each independently of one another represent methyl, vinyl, methoxy, ethoxy, hydrogen or hydroxy, $R_{10}$ represents hydrogen or methyl, $R_{11}$ independently at each occurrence represents methyl, ethyl, propyl, butyl, isopropyl, isobutyl, vinyl, propenyl, butenyl, C5 to C18 alkyl, methacryloxypropyl; mono or dicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, r is a natural number between 0 and 3, s is a natural number between 5 and 75, t is a natural number between 1 and 75, w is a natural number between 5 and 75, v is a natural number between 1 and 75 and u is a natural number between 1 and 10.

3. The polycarbonate composition as claimed in claim 1, wherein $Z_1$, $Z_2$ and $Z_3$ each independently of one another represent methyl, methoxy, ethoxy, hydrogen, or hydroxy.

4. The polycarbonate composition as claimed in claim 1, wherein $Z_1$, $Z_2$ and $Z_3$ each independently of one another represent hydroxy.

5. The polycarbonate composition as claimed in claim 1, wherein $R_{10}$ is hydrogen.

6. The polycarbonate composition as claimed in claim 1, wherein s is a natural number between 1 and 100, t is a natural number between 1 and 75, w is a natural number between 5 and 75, v is a natural number between 1 and 75, and u is a natural number between 1 and 10.

7. The polycarbonate composition as claimed in claim 1, wherein $Z_1$, $Z_2$ and $Z_3$ each independently of one another represent methyl, methoxy, ethoxy, hydrogen, or hydroxy, wherein $R_{10}$ is hydrogen, and wherein s is a natural number between 1 and 100, t is a natural number between 1 and 75, w is a natural number between 5 and 75, v is a natural number between 1 and 75, and u is a natural number between 1 and 10.

8. The polycarbonate composition as claimed in claim 1, wherein $Z_1$, $Z_2$ and $Z_3$ each independently of one another represent hydroxy, wherein $R_{10}$ is hydrogen, and wherein s is a natural number between 1 and 100, t is a natural number between 1 and 75, w is a natural number between 5 and 75, v is a natural number between 1 and 75, and u is a natural number between 1 and 10.

9. A process for producing polysiloxane-polycarbonate block co-condensates, wherein A) at least one polycarbonate is reacted in the melt with B) at least one hydroxyaryl-terminated (poly)siloxane, wherein C) at least one siloxane,
is added to the component A), to the component B) and/or to a mixture of component A) and B), wherein the at least one siloxane is represented by general chemical formula (II), general chemical formula (IIa), general chemical formula (III) and/or general chemical formula (IV)

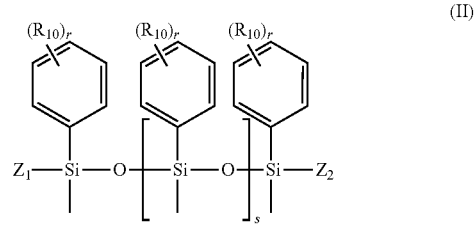
(II)

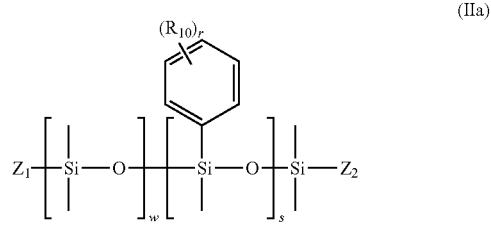
(IIa)

-continued

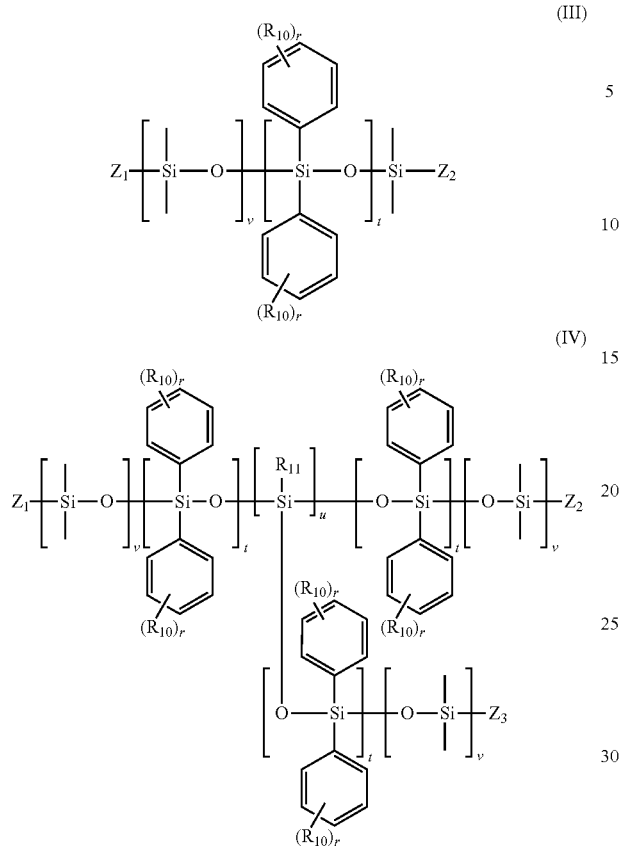

in which $Z_1$, $Z_2$ and $Z_3$ each independently of one another represent methyl, ethyl, propyl, butyl, isopropyl, isobutyl, vinyl, propenyl, butenyl, C5 to C18 alkyl, methacryloxypropyl; mono or dicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, $R_{10}$ independently at each occurrence represents hydrogen, methyl, ethyl, propyl, butyl, isopropyl, isobutyl, isooctyl, isononyl or isodecyl, $R_{11}$ independently at each occurrence represents methyl, ethyl, propyl, butyl, isopropyl, isobutyl, vinyl, propenyl, butenyl, C5 to C18 alkyl, methacryloxypropyl; mono or dicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, r is a natural number between 0 and 3, s and t are each independently of one another a natural number between 1 and 250, and w and v are each independently of one another a natural number between 1 and 250, and groups having the indices s, w, v, t and u can have a random distribution in the at least one siloxane.

10. The process for producing polysiloxane-polycarbonate block co-condensates as claimed in claim 9, wherein
wherein component B) is a hydroxyaryl-terminated (poly)siloxane of formula (1),

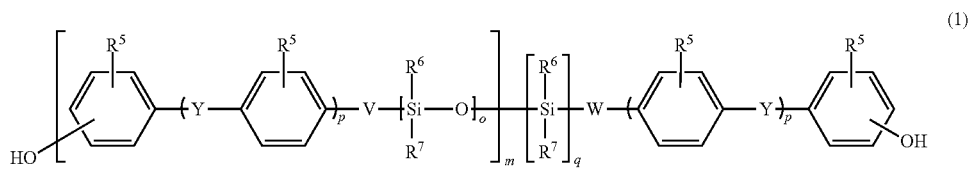

wherein
$R^5$ represents hydrogen or C1 to C4 alkyl,
$R^6$ and $R^7$ independently of one another represent C1 to C4 alkyl,
Y represents a single bond, —CO—, —O—, $C_1$- to $C_5$-alkylene, $C_2$- to $C_5$-alkylidene or a $C_5$- to $C_6$-cycloalkylidene radical which may be mono- or polysubstituted by $C_1$- to $C_4$-alkyl,
V represents oxygen, C2-C6 alkylene or C3- to C6-alkylidene,
when q=0, W represents a single bond,
when q=1, W represents oxygen, C2 to C6-alkylene or C3- to C6-alkylidene,
p and q are each independently 0 or 1,
o represents an average number of repeating units from 10 to 400, and
m represents an average number of repeating units from 1 to 10.

11. The process for producing polysiloxane-polycarbonate block co-condensates as claimed in claim 9, wherein component B) is a hydroxyaryl-terminated (poly)siloxane of formulae (2), (3), (VII), (VIII) or (IX):

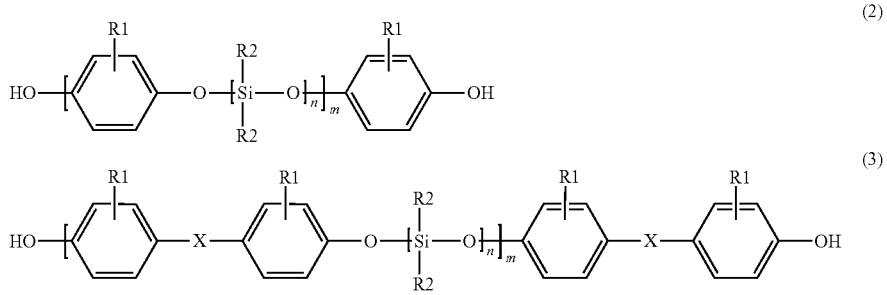

(2)

(3)

wherein R1 represents hydrogen, C1-C4-alkyl,
R2 independently represents aryl or alkyl,
X represents a single bond, C1 to C5-alkylene, C2 to C5-alkylidene, C5 to C12-cycloalkylidene, —O—, —SO— —CO—, —S—, —SO2-, isopropylidene, C5 to C12 cycloalkylidene or oxygen,
n is a number between 10 and 150,
m is a number from 1 to 10,

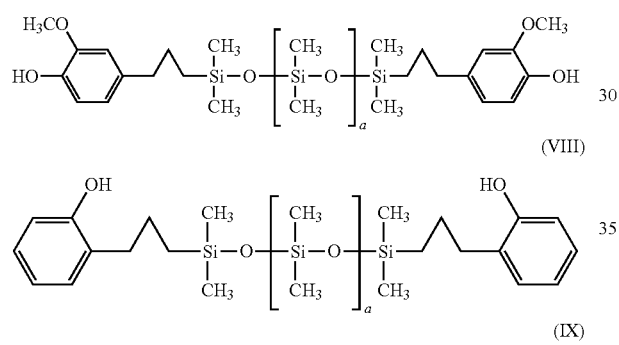

(VII)

(VIII)

(IX)

wherein a in formulae (VII), (VIII) and (IX) represents an average number from 10 to 400.

12. The process for producing polysiloxane-polycarbonate block co-condensates as claimed in claim 9, wherein in general chemical formulae (II), (IIa), (III) and (IV)
$Z_1$, $Z_2$ and $Z_3$ each independently of one another represent methyl, vinyl, methoxy, ethoxy, hydrogen or hydroxy,
$R_{10}$ represents hydrogen or methyl,
$R_{11}$ independently at each occurrence represents methyl, ethyl, propyl, butyl, isopropyl, isobutyl, vinyl, propenyl, butenyl, C5 to C18 alkyl, methacryloxypropyl; mono or dicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN,
r is a natural number between 0 and 3,
s is a natural number between 5 and 75,
t is a natural number between 1 and 75,
w is a natural number between 5 and 75 and
v is a natural number between 1 and 75.

13. The process for producing polysiloxane-polycarbonate block co-condensates as claimed in claim 9, wherein 0.01% to 20% by weight of the component C) are added to the component A), to the component B) and/or to a mixture of component A) and B), wherein the % by weight values are based on the sum of the components A), B) and C).

14. A method for reducing a particle size distribution of siloxane domains in a polysiloxane-polycarbonate block co-condensate by providing the siloxane of general chemical formula (II), general chemical formula (IIa), general chemical formula (III) and/or general chemical formula (IV)

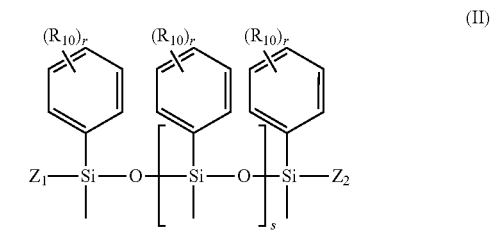

(II)

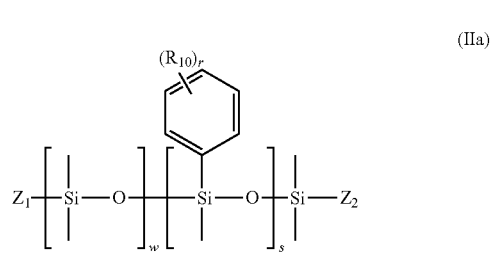

(IIa)

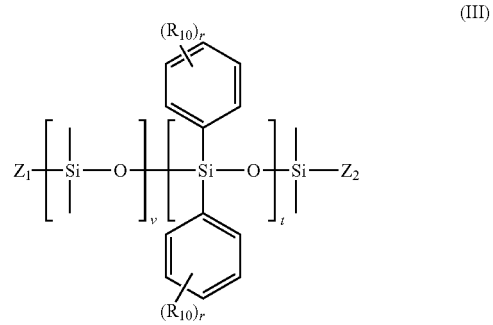

(III)

-continued

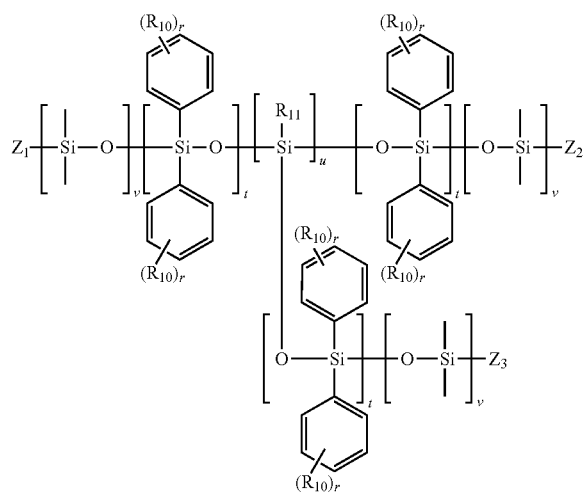

(IV)

in which $Z_1$, $Z_2$ and $Z_3$ each independently of one another represent methyl, ethyl, propyl, butyl, isopropyl, isobutyl, vinyl, propenyl, butenyl, C5 to C18 alkyl, methacryloxypropyl; mono or dicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, $R_{10}$ independently at each occurrence represents hydrogen, methyl, ethyl, propyl, butyl, isopropyl, isobutyl, isooctyl, isononyl or isodecyl, $R_{11}$ independently at each occurrence represents methyl, ethyl, propyl, butyl, isopropyl, isobutyl, vinyl, propenyl, butenyl, C5 to C18 alkyl, methacryloxypropyl; mono or dicarbinol, methoxy, ethoxy, propoxy, butoxy, epoxypropoxypropyl, optionally alkyl- or alkoxy-substituted phenylethyl, phenylisopropyl, 3-phenylpropyl or phenyl, hydroxy, hydrogen, chlorine, fluorine or CN, r is a natural number between 0 and 3, s and t are each independently of one another a natural number between 1 and 250, and w and v are each independently of one another a natural number between 1 and 250, and groups having the indices s, w, v, t and u can have a random distribution in the siloxane.

15. The method as claimed in claim 14, wherein the process for producing the polysiloxane-polycarbonate block co-condensate comprises at least one reactive extrusion or at least one melt transesterification.

* * * * *